United States Patent
Nagashima et al.

[11] Patent Number: 5,909,238
[45] Date of Patent: Jun. 1, 1999

[54] IMAGE TRANSMISSION SYSTEM WITH BILLING BASED ON THE KIND OF MPEG FRAME TRANSMITTED

[75] Inventors: Takayuki Nagashima; Keiichi Iwamura, both of Yokohama, Japan

[73] Assignee: Canon Kabushiki Kaisha, Tokyo, Japan

[21] Appl. No.: 08/685,966

[22] Filed: Jul. 22, 1996

[30] Foreign Application Priority Data

Jul. 25, 1995 [JP] Japan ................................. 7-189282
Jul. 25, 1995 [JP] Japan ................................. 7-189284

[51] Int. Cl.[6] .......................................... H04N 7/173
[52] U.S. Cl. ............................. 348/3; 348/7; 455/2
[58] Field of Search ........................ 348/6, 7, 8, 9, 348/10, 11, 12, 13, 1, 2, 3; 455/31.2, 4.1, 4.2, 5.1, 6.1, 6.2; H04N 7/173

[56] References Cited

U.S. PATENT DOCUMENTS

| | | | |
|---|---|---|---|
| 3,580,989 | 5/1971 | Banning, Jr. .............................. | 178/5.1 |
| 3,746,780 | 7/1973 | Stetten et al. ............................ | 348/7 X |
| 4,759,060 | 7/1988 | Hayashi et al. ........................... | 380/10 |
| 4,833,710 | 5/1989 | Hiroshima ................................. | 380/20 |
| 5,103,392 | 4/1992 | Mori ........................................ | 395/725 |
| 5,481,542 | 1/1996 | Logston et al. ............................ | 348/7 |

FOREIGN PATENT DOCUMENTS

| | | | |
|---|---|---|---|
| 0595354A1 | 5/1994 | European Pat. Off. ......... | H04N 7/16 |
| 0661885A1 | 5/1995 | European Pat. Off. ......... | H04N 7/26 |
| 0656728A2 | 6/1995 | European Pat. Off. ....... | H04N 7/173 |
| 0669587A2 | 8/1995 | European Pat. Off. ........ | G06F 17/60 |
| 0751685A1 | 1/1997 | European Pat. Off. ....... | H04N 7/167 |

OTHER PUBLICATIONS

"An End To End Software Only Scalable Video Delivery System", Choddha et al., Network and Operating System Support For Digital Audio and Video, International Workshop, Apr. 19, 1995, pp. 130–141, Xp002036750.

Primary Examiner—Nathan Flynn
Attorney, Agent, or Firm—Fitzpatrick Cella Harper & Scinto

[57] ABSTRACT

There is disclosed an image transmission system for transmitting MPEG data through a transmission path, capable of setting frames for the MPEG data to be transmitted, according to the traffic in the transmission path, and effecting an accounting process with a charge system corresponding to thus set frames.

93 Claims, 17 Drawing Sheets

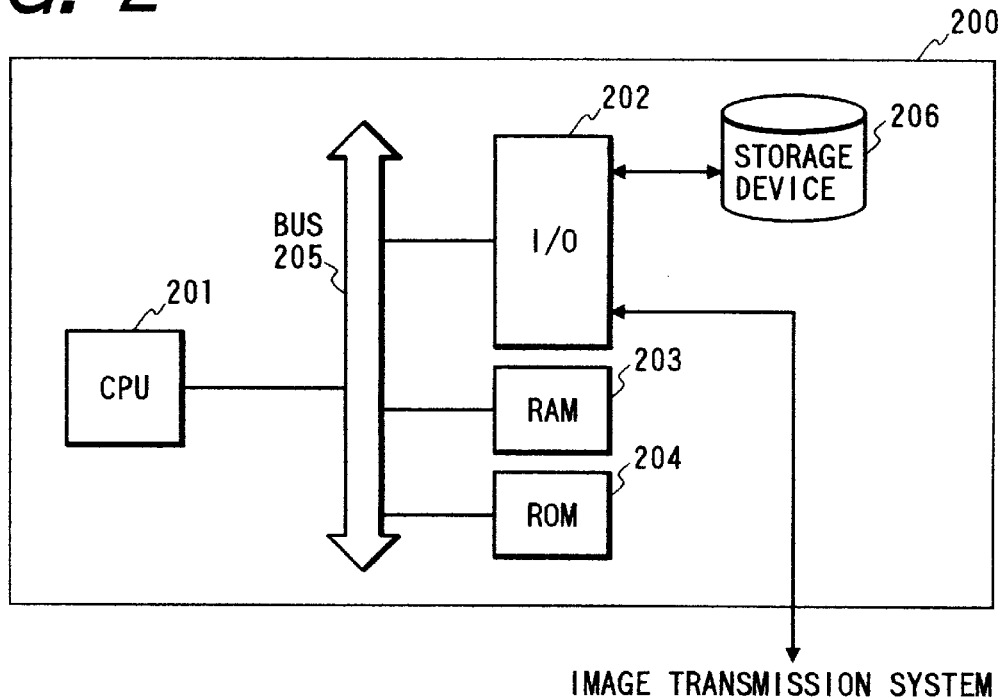

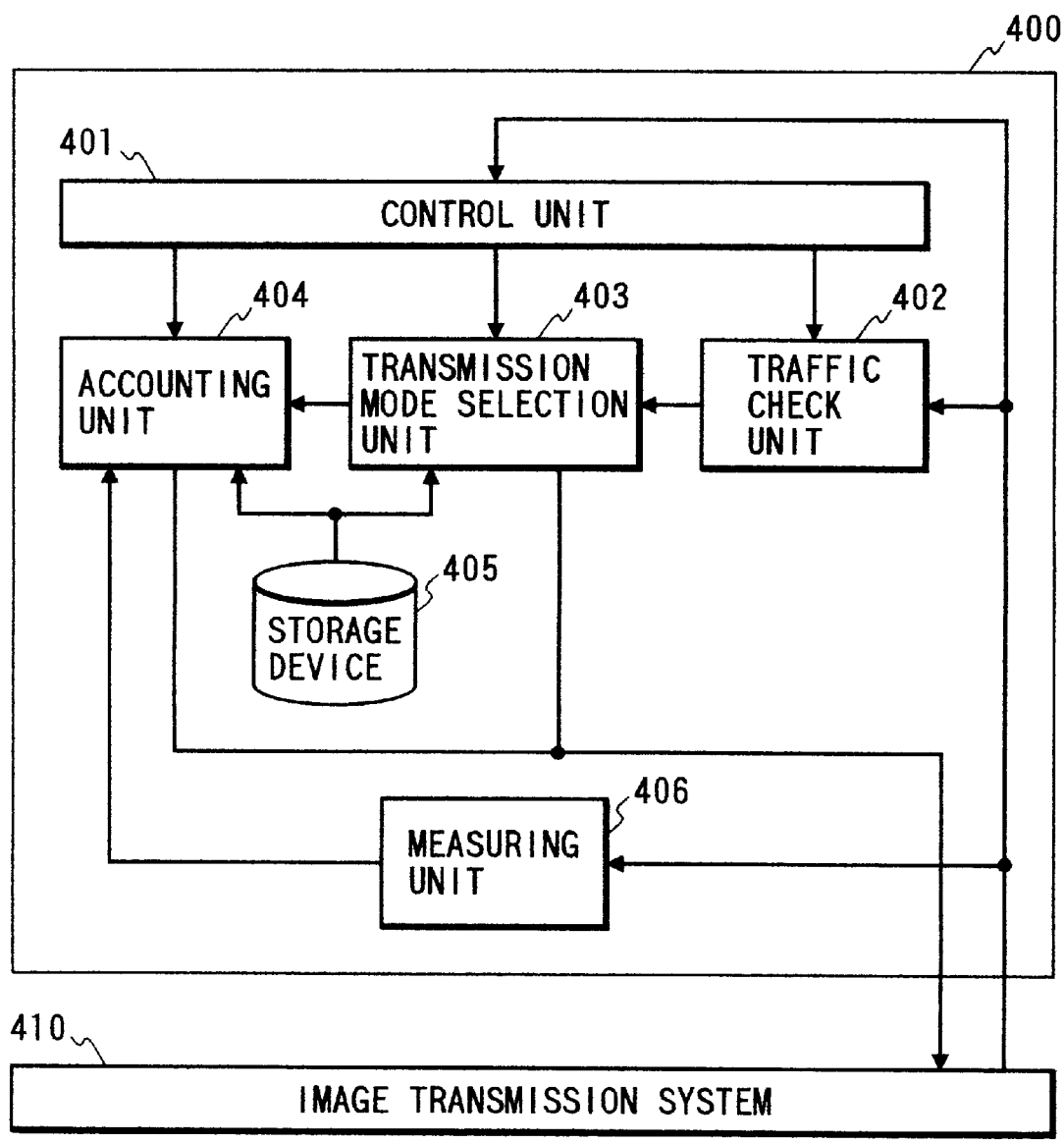

IMAGE TRANSMISSION SYSTEM

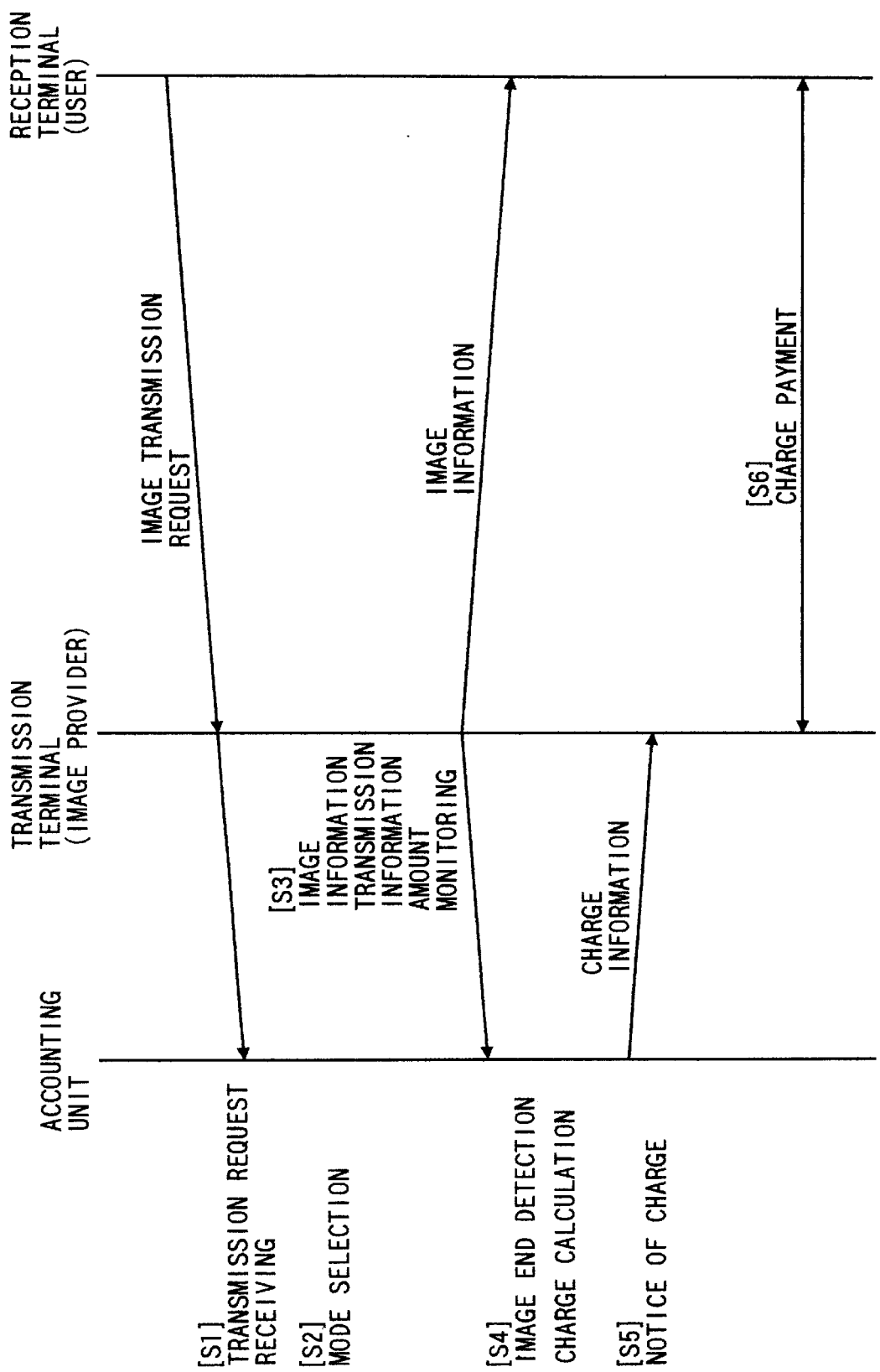

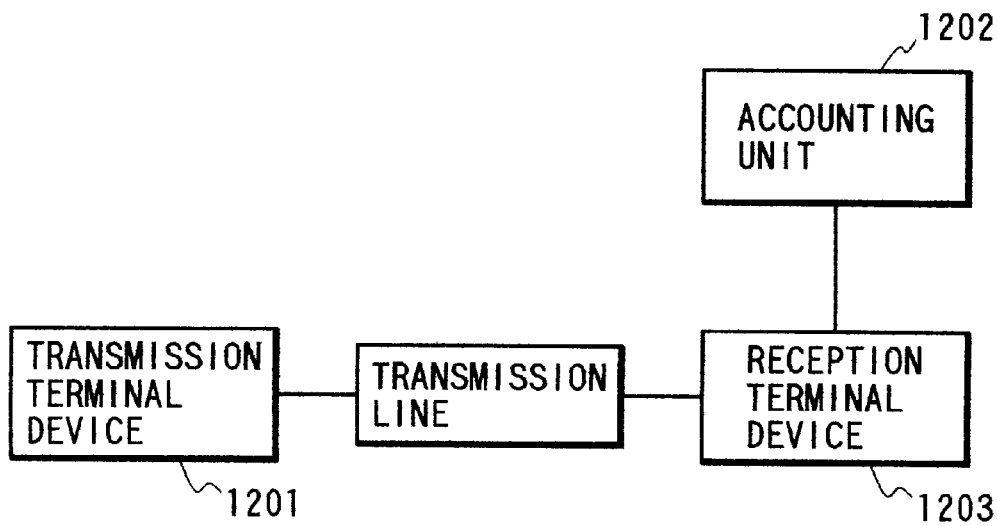
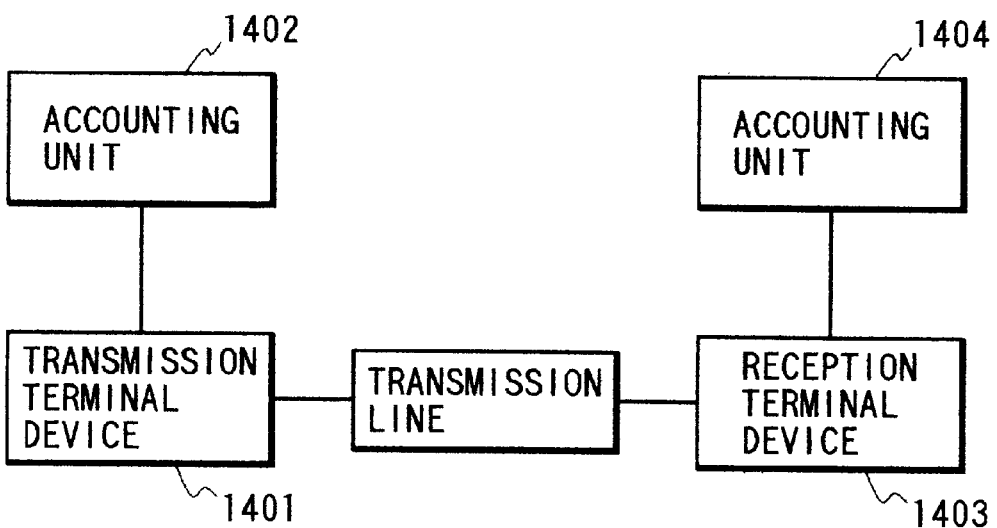

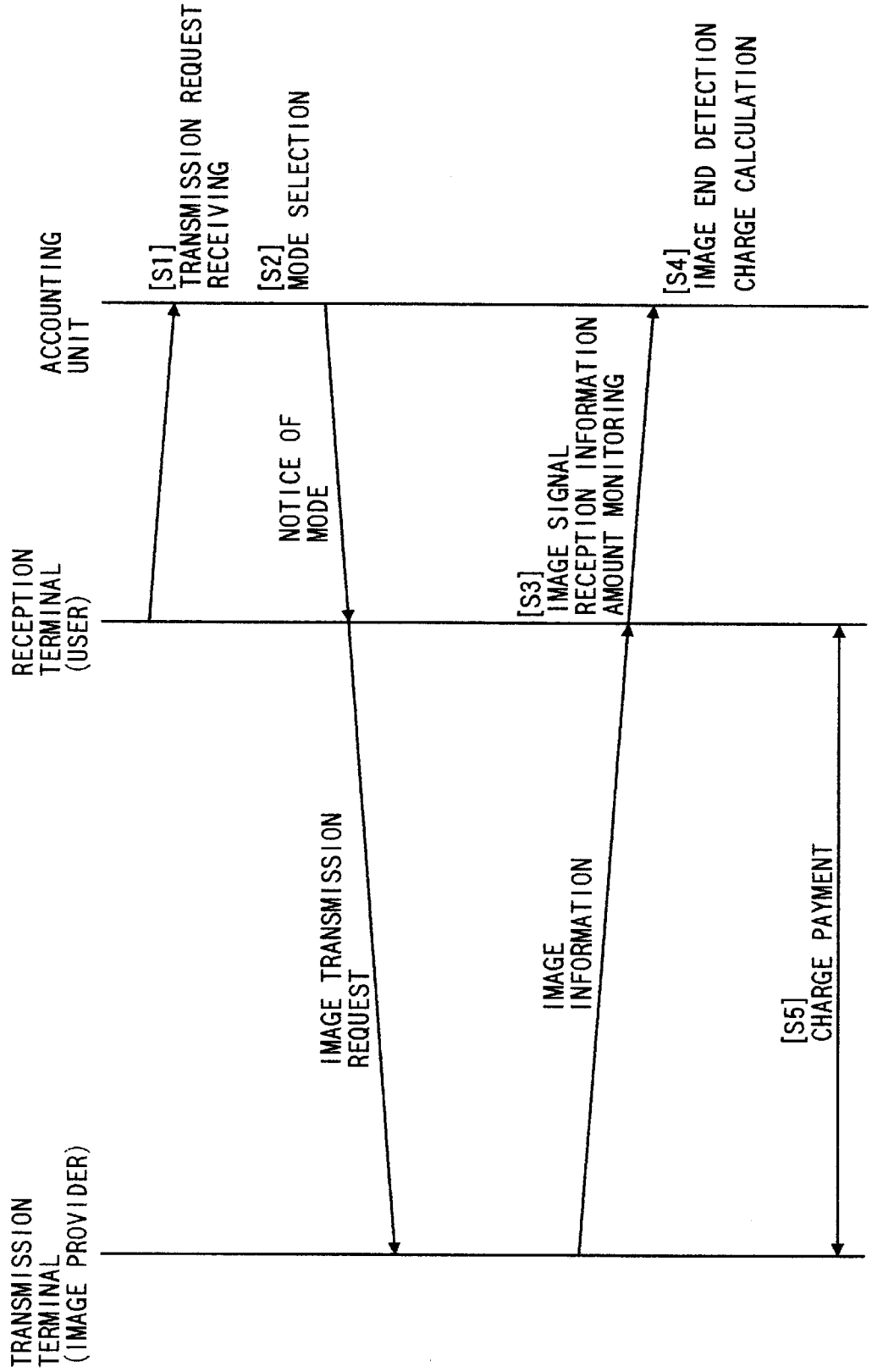

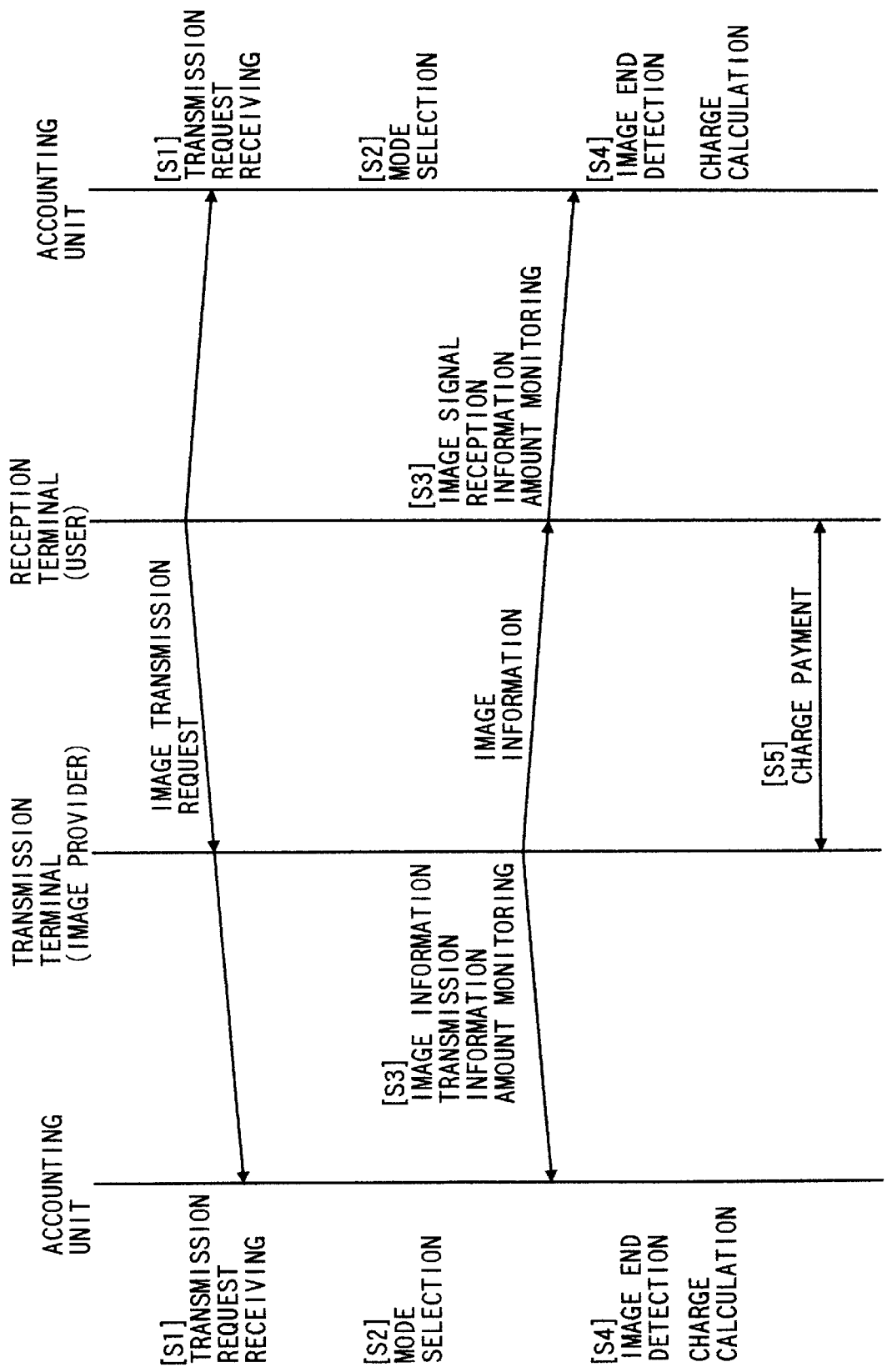

IMAGE TRANSMISSION SYSTEM WITH BILLING BASED ON THE KIND OF MPEG FRAME TRANSMITTED

BACKGROUND OF THE INVENTION

1. Field of the Invention

The present invention relates to information providing in a multimedia network for transmitting various information such as moving image data, still image data, voice data, computer data etc., and an image transmission system corresponding to such information providing.

2. Related Background Art

In recent years, so-called information service industry is showing remarkable progress as a result of installation of the optical fiber network in the main communication networks, spreading of the cable television systems, commercial exploitation of the satellite communication, popularization of local area networks. Such information service industry is to provide various information through such various communication networks and to collect the charge according to the content and quantity of the provided information. In such information service industry, therefore, it is an important issue to effect appropriate charging, for the provided information.

However, the charging system conventionally employed in the information service industry has mostly been a monthly charging for charging a fixed charge regardless of the frequency of use, such as in the cable television systems or in the satellite broadcasting, or a charging method only counting the frequency or time of use regardless of the kind or quality of the provided information, such as in the computer utilizing service.

SUMMARY OF THE INVENTION

In consideration of the foregoing, the object of the present invention is to enable charging, in consideration of the kind of the information or service and the quality of the information.

The above-mentioned object can be attained, according to an object of the present invention, by an image transmission system for transmitting MPEG data through a transmission path, capable of setting a frame of the MPEG data to be transmitted, according to the traffic of the transmission path and effecting the charging according to a charge system corresponding to thus set frame.

According to another embodiment of the present invention, there is provided an image transmission system for transmitting MPEG data between a transmission terminal and a receiving terminal through a transmission path, comprising a receiving terminal including frame setting means for setting a frame for the MPEG data to be transmitted, according to the traffic of the transmission path, accounting process means for effecting an accounting process with a predetermined charging system, and a transmitting terminal including image charge information storing means for storing the charge information for the images to be used in the above-mentioned accounting process.

Also according to still another embodiment of the present invention, there is provided an image transmission system for transmitting MPEG data through a transmission path, comprising frame setting means for setting a frame for the MPEG data to be transmitted, according to the traffic of the transmission path, and accounting process means for effecting an accounting process with a charge system according to the frames of the transmitted MPEG data and the amount of information.

Also according to still another embodiment of the present invention, there is provided an image transmission system for transmitting MPEG data through a transmission path, comprising traffic check means for checking the traffic of the transmission path, frame setting means for setting a frame for the MPEG data to be transmitted, according to the traffic of the transmission path, accounting process means for effecting an accounting process with a predetermined charge system, information amount measuring means for measuring the amount of information of the image transmitted through the transmission path, and image charge information storage means for storing the charge information for the image, to be used in the accounting process.

Also according to still another embodiment of the present invention, there is provided an image transmission system for transmitting MPEG data through a transmission path, comprising traffic check means for checking the traffic of the transmission path, frame setting means for setting a frame for the MPEG data to be transmitted, according to the traffic of the transmission path, accounting process means for effecting an accounting process with a charge system according to the frames and the amount of information of the transmitted MPEG data, and image charge information storage means for storing the charge information of the image, to be used in the accounting process.

According to still another embodiment of the present invention, there is further provided charge paying means for paying the charge at a predetermined interval.

According to still another embodiment of the present invention, the above-mentioned accounting process means is provided in the transmitting side.

Also according to still another embodiment of the present invention, the above-mentioned accounting process means is provided in the receiving side.

Also according to still another embodiment of the present invention, the above-mentioned accounting process means is provided both in the transmitting side and in the receiving side.

Also according to still another embodiment of the present invention, there are provided image transmission destination designating means for designating an arbitrary image receiving apparatus for the destination of image transmission and requesting the image transmission for an image provider, image transmission means for transmitting the image to the image receiving apparatus designated by the image transmission destination designating means, and accounting process means for effecting the charge accounting either to the designated destination of the image or to the user receiving the image.

Also according to still another embodiment of the present invention, there is provided cypher means for effecting at least encyphering or digital signature to the transmitted information.

Owing to the technologies mentioned above, the embodiments of the present invention allow to set a frame for the MPEG data to be transmitted, according to the traffic of the transmission path, and to apply a charge for the image according to the content of thus set frame.

Also according to still another embodiment of the present invention, it is rendered possible to effect the accounting process with a charge system taking into consideration the amount of information of the image in addition to the content of the transmitted frame.

Also according to still another embodiment of the present invention, it is rendered possible to effect payment of the charge at a predetermined interval.

Also according to still another embodiment of the present invention, it is rendered possible to protect the information from theft or illegal alteration and to effect fair accounting.

Another image transmission apparatus of the present invention, for handling the MPEG data, is featured by comprising accounting means for effecting an accounting process according to the kind of the transmitted frame among the MPEG data, and charge storage means for storing the charge for the image.

Still another image transmission system of the present invention, for handling MPEG data, is featured by comprising accounting means for effecting an accounting process according to the kind of the transmitted frame.

Still another image transmission system of the present invention, for handling MPEG data, is featured by comprising accounting means for effecting an accounting process according to the kind and the amount of information of the transmitted frame, among the MPEG data.

According to still another feature, there is provided an image transmission system for handling MPEG data, comprising accounting means for effecting an accounting process according to the kind of the transmitted frame among the MPEG data, information amount measuring means for measuring the amount of information of the transmitted frame, and charge storage means for storing the charge for the image.

According to still another feature, there is provided an image transmission system for handling MPEG data, comprising accounting means for effecting an accounting process according to the kind and the amount of information of the transmitted frame among the MPEG data, and charge storage means for storing the charge for the image.

According to still another feature, there is provided an image transmission system for handling MPEG data, comprising accounting means for effecting an accounting process according to the kind and the amount of information of the transmitted frame among the MPEG data, information amount measuring means for measuring the amount of information of the transmitted frame, and charge storage means for storing the charge for the image.

According to still another embodiment of the present invention, there is provided an image transmission system for handling MPEG data, comprising accounting means for transmitting all the frames of the MPEG data and effecting an accounting process according to the kind of the frame decoded among the MPEG data.

Owing to the technologies mentioned above, the embodiments of the present invention allow to apply the charge for the image for each mode.

According to still another embodiment of the present invention, since the accounting is made according to the mode and the amount of information of the image information, it is rendered possible to account the charge for the image for each mode and also in consideration of the amount of information.

According to still another embodiment of the present invention, there is provided paying means for paying the charge at a predetermined interval, so that the charge accounting can be made at a predetermined period by calculating the accumulated charge.

According to still another embodiment of the present invention, it is rendered possible to effect an accounting process according to the kind of the decoded frame among the transmitted MPEG data.

Still other objects of the present invention, and the features thereof, will become fully apparent from the following description which is to be taken in conjunction with the attached drawings.

BRIEF DESCRIPTION OF THE DRAWINGS

FIG. 2 is a block diagram showing a specific example of the configuration of the accounting process means in the first embodiment;

FIG. 3 is a view showing an example of the charge table to be used by the accounting process means of the first embodiment;

FIG. 4 is a schematic block diagram of the accounting process means in a second embodiment;

FIG. 11 is a view showing the function of the image transmission system in the fourth embodiment;

FIG. 12 is a block diagram showing the basic configuration of an image transmission system in a fifth embodiment;

FIG. 13 is a view showing the function of the image transmission system in the fifth embodiment;

FIG. 14 is a block diagram showing the basic configuration of an image transmission system in a sixth embodiment;

FIG. 15 is a view showing the function of the image transmission system in the sixth embodiment;

DETAILED DESCRIPTION OF THE PREFERRED EMBODIMENTS

Figure 1:
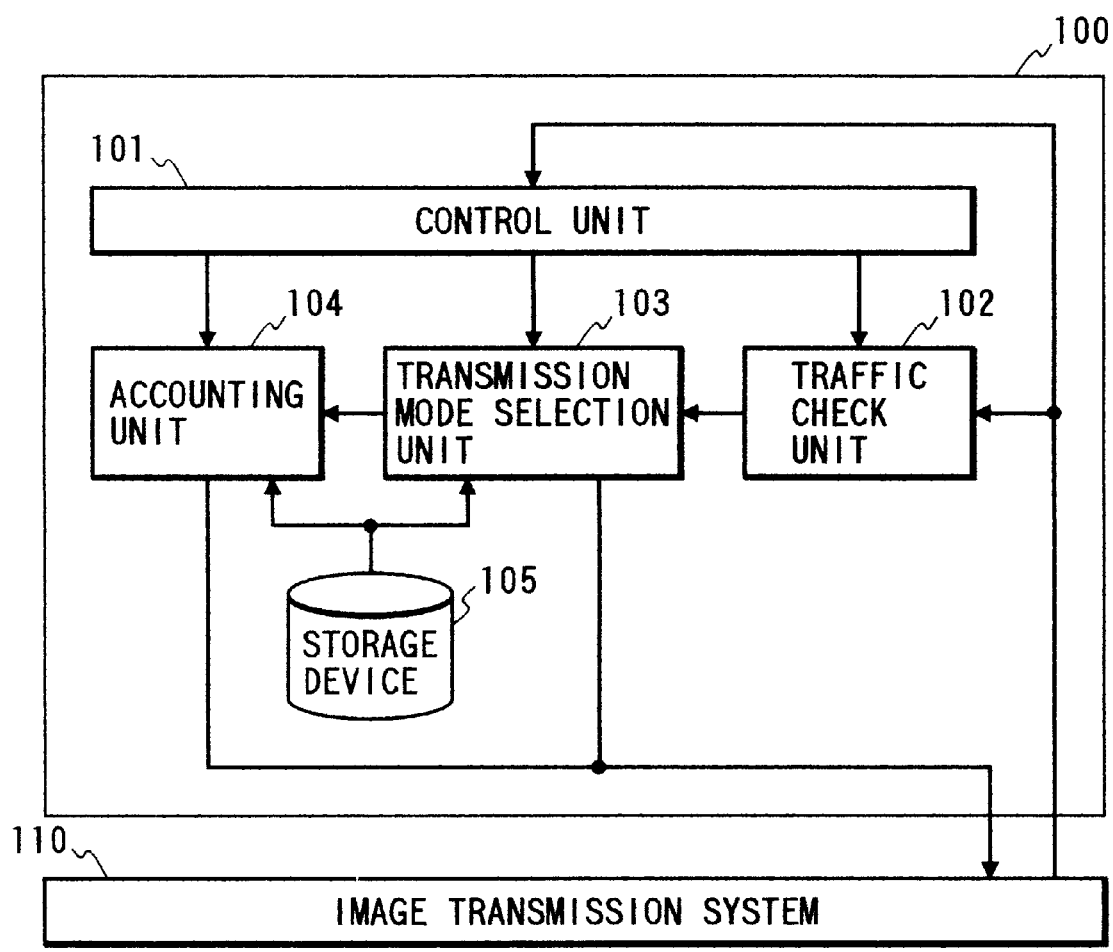
FIG. 1 is a schematic block diagram showing accounting process means of a first embodiment.

Now the image transmission system of the present invention will be clarified in detail by preferred embodiments thereof, with reference to the attached drawings.

Following embodiments are applied to a transmission system for transmitting MPEG data through a transmission path, for enabling, in consideration of the feature of the MPEG data, to set a frame for the MPEG data to be transmitted according to the traffic of the transmission path and to a charge for the image according to the above-mentioned frame.

Particularly in a first embodiment, there will be explained accounting process means for effecting an accounting process with a charging system in which charges are determined respectively for a case of transmitting an I frame only, a case of transmitting an I frame and a P frame, and a case of transmitting an I frame, a P frame and a B frame.

In a second embodiment, there will be explained the accounting process means with a charge system in consideration of the amount of information of the image, in addition to the case of transmitting an I frame only, an I frame and a P frame, and an I frame, a P frame and a B frame.

In a third embodiment, there will be explained the accounting process means for accounting the charge at a predetermined interval in the first and second embodiments.

In a fourth embodiment, there will be explained a configuration in which the accounting process means in the first to third embodiments is provided in the image providing side.

In a fifth embodiment, there will be explained a configuration in which the accounting process means in the first to third embodiments is provided in the image receiving side.

In a sixth embodiment, there will be explained a configuration in which the accounting process means in the first to third embodiments is provided both in the image providing side and in the image receiving side.

In a seventh embodiment, there will be explained a configuration in which the accounting process means in the foregoing first to sixth embodiments is applied to the communication between equipment connected to a local area network.

In an eighth embodiment, there will be explained a configuration in which the accounting process means in the foregoing first to sixth embodiments is applied to the communication between equipment connected to a wide area network.

In a ninth embodiment, there will be explained a configuration in which cypher means is combined with the accounting process means shown in the foregoing fourth to eighth embodiments, for protecting the information from theft or illegal alteration and realizing fair accounting.

In a tenth embodiment, there will be explained accounting process means with a charge system in which charges are determined respectively for a case of transmitting all the MPEG data for an image and decoding an I frame only, a case of decoding an I frame and a P frame, and a case of decoding an I frame, a P frame and a B frame.

In an eleventh embodiment, there will be explained a configuration in which cypher means is combined with the accounting process means in the foregoing first to tenth embodiments, for protecting the information from theft or illegal alteration and realizing fair accounting.

In the following there will be explained the first embodiment of the present invention, with reference to the attached-drawings. Prior to the detailed description of the first embodiment, there will be given an explanation on the MPEG (Moving picture experts group) method employed for encoding for efficient storage and transmission of the moving picture information.

The MPEG is an international standard designed for highly efficient encoding of the moving image and achieves a high efficiency in the encoding utilizing the frequency characteristics of the data and the visual characteristics of human being, and also the redundancy in the time axis, specific to the moving image.

In the MPEG system, there are known MPEG1 with a maximum transfer rate of 1.5 Mbps for the digital storage media, and MPEG2 designed for use all the transmission systems such as the bidirectional multimedia equipment, digital VCR, advanced television, optical fiber network etc. without the upper limit in the transfer rate, but the basic algorithm is almost same for the both. In the following, therefore, there will be explained the encoding principle and the data structure, principally taking the MPEG1 as an example.

At first there will be explained the principle of highly efficiency encoding by the MPEG system. In this encoding system, a high efficiency in the encoding can be realized by calculating the difference between the frames, thereby reducing the redundancy in the direction of time axis, and effecting DCT and variable-length encoding on thus obtained difference data, thereby reducing the redundancy in the spatial direction.

The above-mentioned redundancy in the time axis can be reduced, in consideration of the high correlation among the continuous frames in the moving image, by calculating the difference between the frame to be encoded and a preceding or succeeding frame.

Figure 20:
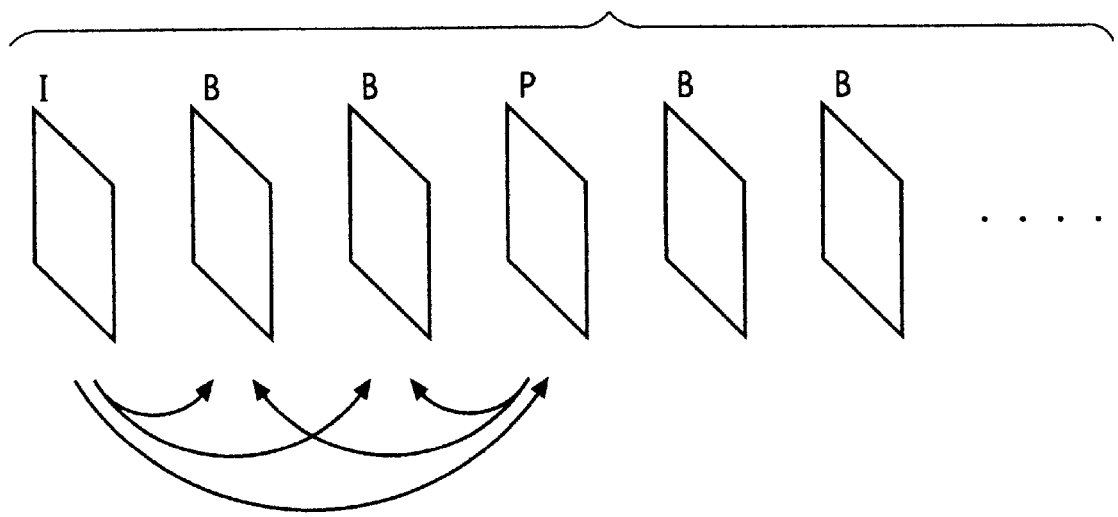
FIG. 20 is a view showing the frame configuration in the MPEG data.

In the MPEG system, therefore, there are provided, as shown in FIG. 20, in addition to an intra-encoded picture obtained by an encoding mode of effecting the encoding within a frame, a preceding prediction encoded image (P-picture) obtained by encoding the difference from a frame preceding in time, and a bidirectional prediction encoded image (B-picture) obtained by encoding the one with the least data amount among the difference from a frame preceding in time, that from a frame succeeding in time and that from an interpolated frame of the above-mentioned two frames, and the frames obtained by such encoding modes are combined in a predetermined sequence.

In the MPEG system, a unit or a GOP (group of pictures) is composed of an I-picture, 4 P-pictures and 10 B-pictures, and there is recommended a combination of the I-picture at first, followed by repetition of two B-pictures and a certain number of P-pictures. The I-pictures is provided at a predetermined interval to enable special reproduction such as reverse reproduction and a partial reproduction utilizing the above-mentioned GOP as a unit, and also to prevent the propagation of the error.

In case a new object appears in the frame, the difference from the succeeding frame may become smaller than that from the preceding frame. For this reason, the MPEG system effects the above-explained bidirectional prediction encoding to achieve a higher efficiency in the encoding.

Also the MPEG system effects movement compensation by calculating the difference between a predetermined block (macroblock) containing 4 blocks of 8×8 pixels each for the luminance data and 2 blocks for the color difference signals, and a macroblock in the vicinity of the corresponding block in the preceding or succeeding frame, then detecting a movement vector by searching a macroblock showing the least difference, and encoding such movement vector as data.

At the decoding operation, this movement vector is used for extracting the data of the corresponding macroblock in the preceding or succeeding frame, and such extracted data are used in decoding the data encoded with movement compensation.

In such movement compensation, the frame preceding in time is once encoded and decoded to obtain the preceding frame, and the movement compensation is achieved by the macroblock in such preceding frame and that of the frame to be encoded.

The movement compensation in the MPEG1 is conducted between the frames, but that in the MPEG2 is conducted between the fields.

The difference data and the movement vector obtained by such movement compensation are further subjected to highly efficient encoding by the DCT transformation and the Huffman encoding.

In the following there will be explained the data structure of the MPEG system.

Figure 21:
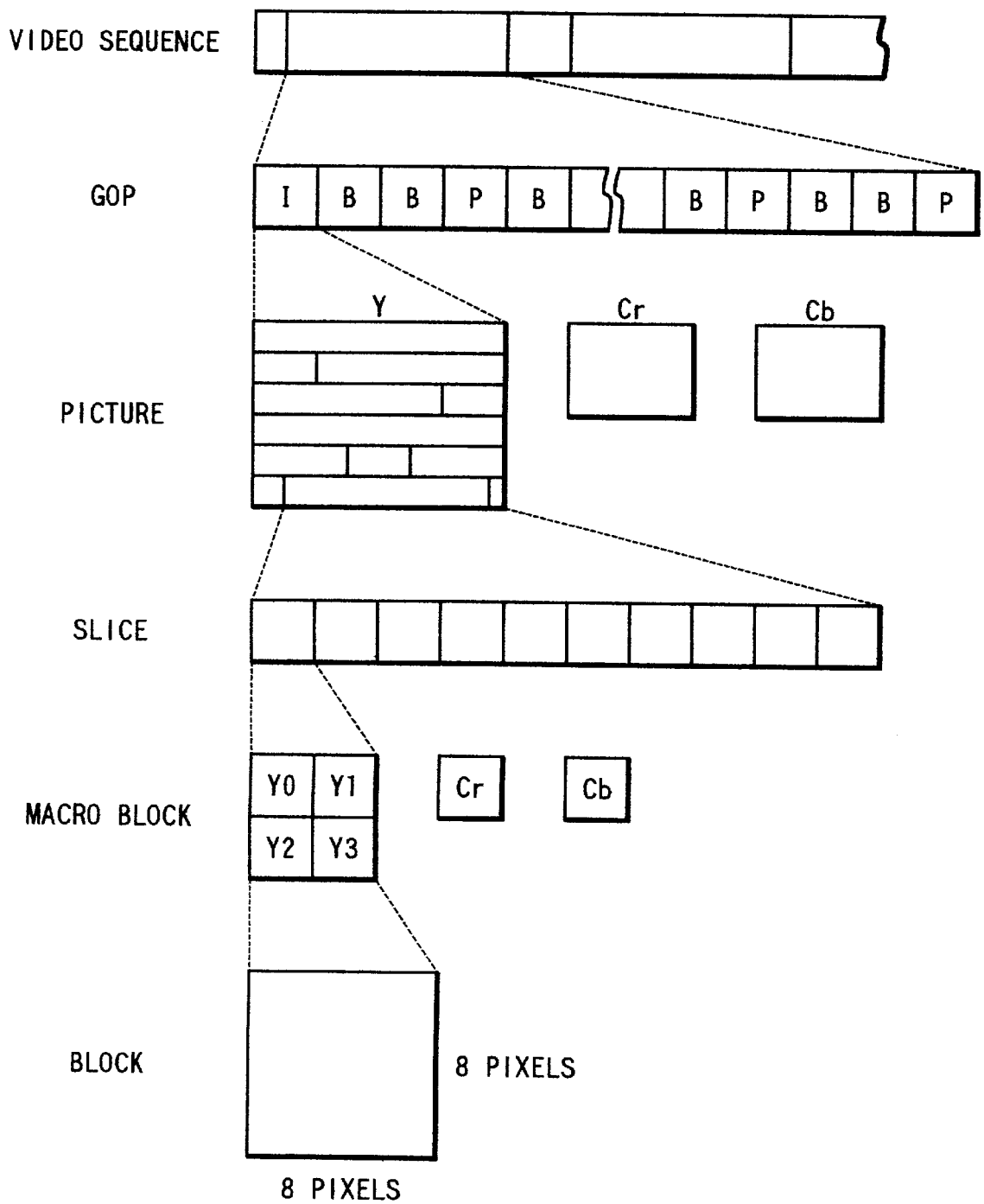
FIG. 21 is a view schematically showing the format of the MPEG encoded image data.

The MPEG data have a hierarchic structure consisting, as shown in FIG. 21, of a video sequence layer, a GOP layer, a picture layer, a slice layer, a macroblock layer and a block layer.

These layers will be explained in the following, starting from the lowermost one.

The block layer is composed, as in the JPEG system, of blocks, each consisting of 8×8 pixels for the luminance data and the color difference data, and the DCT transformation is conducted in the unit of each block.

The macroblock layer is composed of macroblocks, each consisting of 4 blocks of 8×8 pixels each for the luminance data and 1 block for each color data, associated with a microblock header. In the MPEG system, this macroblock is used as the unit for the movement compensation and the encoding, as will be explained later.

The above-mentioned macroblock header contains data of the movement compensation and the digitizing step in each macroblock unit, and data indicating whether the six DCT blocks (Y0, Y1, Y2, Y3, Cr, Cb) in each macroblock contain data.

The slice layer is composed of one or more macroblocks consecutively arranged in the order of image scanning, and a slice header, and same quantizing steps can be employed for the macroblocks within the same slice layer.

The above-mentioned slice header contains data relating to the quantizing steps within each slice layer, and same quantizing steps are applied within the same slice layer unless quantizing steps are provided specific to each macroblock. The first macroblock resets the difference for the DC component.

The picture layer contains a plurality of the slice layers in the unit of a frame, and is composed of a header containing a picture start code etc. and one or more slice layers. The above-mentioned header contains a code indicating the image encoding mode and a code indicating the precision (in the unit of a pixel or a half pixel) of the movement detection.

The GOP layer is composed of a header including for example a group start code and a time code indicating the time from the start of sequence, and a plurality of I-, B- and P-frames.

The video sequence layer starts with a sequence start code and ends with a sequence end code, between which arranged are control data required for the decoding of the image size and the aspect ratio, and a plurality of GOP of a same image size. In the MPEG system of such data structure, the bit stream is defined by the standard thereof. Such encoding technology is already well known in the multimedia networks.

In the MPEG system, as explained in the foregoing, the I-frame represents the approximate movement of the moving image independently from the P- or B-frame, while the P-frame, when decoded in combination with the I-frame, reproduces the smoother movement of the moving image. Also the B-frame, when decoded in combination with the I- and P-frames, allows to reproduce further smoother movement.

In consideration of such features, the MPEG system can be considered an encoding system that deals with the image movement in hierarchic manner. The required transmission capacity is larger for the transmission of the I- and P-frames than for the transmission of the I-frame only, and even larger for the transmission of the I-, P- and B-frames.

Therefore, for transmitting the MPEG data, there can be conceived a transmission method of at first effecting the MPEG encoding for the image to be transmitted, then inspecting the state of use of the transmission path, and, if there is a sufficient available capacity, transmitting all the frames of the image information.

If the available capacity is not sufficient for transmitting all the frames, the I- and P-frames alone are transmitted. If the available capacity is even lower, the I-frame alone is transmitted. Such transmission technology is an important component technology in dealing with the multimedia data in the LAN (local area network) etc.

The present embodiment is applied to an image transmission system for transmitting the MPEG data through a transmission path, for selecting the frames of the MPEG data to be transmitted, in consideration of the feature of the MPEG data and according to the traffic in the transmission path, and for realizing accounting process means for effecting an accounting process with a charge system determined corresponding to the transmitted frames for each image.

In the present embodiment, the MPEG data transmission mode is defined as a mode 1 in case of transmitting the I-frame only, a mode 2 in case of transmitting the I- and P-frames, and a mode 3 in case of transmitting the I-, P- and B-frames.

FIG. 1 is a functional block diagram showing the principal parts of accounting process means in the image transmission system of the present invention, wherein accounting process means 100 is provided in the image transmission system. A control unit 101 fetches a request for image transmission from the user, transmitted in the image transmission system, accordingly controls a traffic check unit 102, a transmission mode selection unit 103 and an accounting unit 104, and informs the transmission mode selection unit 103 and the accounting unit 104 of an image identifier (name or code for identifying the image) requested therefrom.

A traffic check unit 102 checks the currently available transmission capacity (traffic information) by monitoring the image transmission system 110 (or transmission path) or inquiring the image transmission system 110 of the information on the traffic status managed therein, and informs the transmission mode selection unit 103 of the result of such check.

A transmission mode selection unit 103 receives the identifier of the requested image from the control unit 101 and the traffic information of the image transmission system from the traffic check unit 102, selects a transmission mode for the image transmission according to the traffic information, and informs the accounting unit 104 and the image transmission system 110 of such transmission mode.

An accounting unit 104 fetches the image identifier from the control unit 101 and the transmission mode information from the transmission mode selection unit 103, reads a charge corresponding to such fetched information from a storage unit 105 and informs the image transmission system 110 of such charge.

A storage unit 105 stores the charge information of the image, to be referred to by the accounting unit 104.

An image transmission system 110 is composed of a network and terminals connected thereto with wires or with wireless connections, such as computers, receivers, printers, monitors etc. It is to be noted that the above-explained functions need not necessarily be divided in the above-explained manner, and the plural functional blocks may be united in a functional block, or there may be provided plural blocks for any of the foregoing functions.

In the following there will be explained an example of the traffic checking method in the traffic check unit 102, in case the image transmission system 110 is realized with the ATM (asynchronous transfer mode).

The traffic check unit 102 inquires the image transmission system 110 whether the transmission is possible with a certain transfer rate Cr. If the image transmission system 110 does not permit the transmission with such transfer rate Cr, the enquiry to the image transmission system 110 for a transfer rate C'r smaller than Cr until the permission is given. On the other hand, if the image transmission system 110 permits the transmission with the transfer rate Cr, it is set as the check value.

However, in the image transmission system constructed with other network systems, there may be employed other traffic checking methods corresponding to such network systems. Thus the traffic checking method of the present embodiment is not limited to the above-explained case of the ATM.

In the following there will be explained an example of the transmission mode selecting method in the transmission mode selection unit 103.

At first the transmission mode selection unit 103 receives the information on the traffic status of the image transmission system 110 from the traffic check unit 102, and also receives the identifier of the requested image from the control unit 101.

Then it compares the transmission capacity required for transmitting the requested image in each transmission mode with the traffic (available transmission capacity) of the image transmission system, by making access to the storage unit 105 (of which stored information will be explained later with reference to FIG. 3), and determines the transmission mode for the image transmission in the following manner.

For the available transmission capacity Cr determined by the traffic check unit 102 and for the transmission capacities C1, C2, C3 required for transmitting certain MPEG data respectively in the transmission modes 1, 2 and 3, the transmission mode 3 is selected if Cr≧C3.

Also the transmission mode 2 is selected in case C3>Cr≧C2, and the transmission mode 1 is selected in case C2>Cr≧C1. In case of C1>Cr, the image transmission system is informed of a fact that an enough transmission capacity cannot be obtained even in the transmission mode 1.

However, the function of the transmission mode selection unit 103 is not limited to the one explained above. For example it may execute the image transmission with a transmission mode i (i=1, 2, . . . ) for the transmission capacity Cr, even in case Cr is insufficient for the image transmission with such mode i (Cr<Ci) or it may wait until a sufficient capacity Cr (≧Ci) can be obtained.

FIG. 3 shows an example of the charge table stored in the storage unit 105. FIG. 3, indicates, example, the information Info 1 corresponds to a charge 11 in case it is provided with the transmission mode 1 and requires in such case a transmission capacity C11.

The table also indicates that the same information corresponds to a charge 12 when provided in the transmission mode 2 and requires a transmission capacity C12, and that the same information corresponds to a charge 13 when provided in the transmission mode 3 and requires a transmission capacity C13.

In the following there will be explained the function of the accounting process means of the present embodiment with the charge system determined for each transmission mode, in case a user (or a terminal of the user) requests an image Info 1 from the provider in a state where the image transmission system has an available transmission capacity Cr (C13>Cr≧C12).

In a first operation sequence, the control unit 101 fetches information that the user requests the transmission of the image Info 1, by monitoring the messages exchanged in the image transmission system or by receiving a message therefrom.

Then, in a second operation sequence, the traffic check unit 102 checks the current traffic status of the image transmission system 110, thereby obtaining the available transmission capacity Cr.

Then, in a third operation sequence, the control unit 101 informs the transmission mode selection unit 103 of the identifier of the requested image Info 1. Also the traffic check unit 102 informs the transmission mode selection unit 103 of the above-mentioned available transmission capacity Cr. Also the transmission mode selection unit 103 reads, from the storage unit 105, the transmission capacities required for transmitting the image Info 1 with the transmission modes, then compares these transmission capacities with the above-mentioned available transmission capacity thereby determining the transmission mode 2 corresponding to the traffic status, and informs the image transmission system 110 of the transmission mode.

Then, in a fourth operation sequence, the control unit 101 informs the accounting unit 104 of the identifier of the requested image Info 1, and the transmission mode selection unit 103 informs the accounting unit 104 of the selected transmission mode 2.

The accounting unit 104 reads, from the charge table stored in the storage unit 105 as shown in FIG. 3, the charge 12 corresponding to the image identifier Info 1 informed from the control unit 101 and the transmission mode 2 informed from the transmission mode selection unit 103 and informs the charge to the image transmission system 110.

FIG. 2 is a block diagram showing a specific example of the configuration of the accounting process means 100 shown in FIG. 1.

Referring to FIG. 2, accounting process means 200 corresponds to the means 100 in FIG. 1. A CPU 201 processes an input from an I/O interface 202 and sends instructions to the external units according to a program stored in a ROM 204 or a RAM 203.

An I/O interface 202 is used for exchanging information with the image transmission system and for input/output with a storage device 206. A RAM 203 is used as a temporary memory for the CPU 201 and for program storage.

A ROM 204 stores the program to be executed by the CPU 201. It may however be dispensed with in case the program is read from the outside of the accounting process means 200 or is stored in the RAM 203.

A bus 205 is used for data exchange of the CPU 201—ROM 204. A storage device 206, for storing the charges for the respectively transmission modes for each image, can be composed, for example, of a magnetic medium, an optical medium or a semiconductor device.

The functions of the control unit 101, the traffic check unit 102, the transmission mode selection unit 103 and the accounting unit 104 shown in FIG. 1 can be realized, in the configuration shown in FIG. 2, by the CPU 201, the I/O interface 202, the RAM 203, the ROM 204 and the bus 205.

For example, the control of the aforementioned operation sequences, the traffic checking, the transmission mode selection and the accounting process are executed by the CPU 201, and the sequences and methods therefore are stored in the RAM 203 or the ROM 204. The traffic checking in the first operation sequence, the informing of the transmission mode in the second operation sequence, and the informing of the charge in the fourth operation sequence are executed through the I/O interface 202.

However the configuration realizing the functional blocks shown in FIG. 1 is not limited to that shown in FIG. 2, and it is also possible to construct a part or all of the functional blocks shown in FIG. 1 into a single device. Also the operations are not limited to those explained in the foregoing, but the following operations are also included in the present embodiment.

For example the second and third operation sequences are united into a single sequence, and the transmission mode selection unit 103 reads the transmission capacity Ci required for transmitting the Info 1 with a transmission mode i. This transmission capacity Ci is informed to the traffic check unit, which then inspects whether the transmission can be made with such transmission mode i.

If the transmission is not possible, the transmission mode selection unit 103 reads the transmission capacity required in a lower transmission mode (for example mode i−1). This operation is repeated, and, when the transmission is identified possible, the transmission mode selection unit informs the image transmission system and the accounting unit of thus identified transmission mode.

Otherwise, in the first operation sequence, the user designates the transmission mode at the request for image, and, if the image can be transmitted in the designated transmission mode in the second to fourth operation sequences, the transmission mode selection unit 103 sends an instruction to transmit the data with the designated mode to the image transmission system, and the accounting unit 104 executes the accounting process in such transmission mode.

In case the transmission is not possible, the transmission mode selection unit 103 either effects transmission with an available rate, or waits until the transmission becomes possible. Otherwise it informs the image transmission system of a process of transmission with a lowered transmission mode or of cancelling the request. The accounting unit 104 effects an accounting process according to such process.

In the following there will be explained a second embodiment of the present invention, with reference to the attached drawings.

The present embodiment is applied to an image transmission system for transmitting the MPEG data through a transmission path, for selecting the frames of the MPEG data to be transmitted in consideration of the feature of the MPEG data and according to the traffic in the transmission path, also for determining a unit charge per unit amount of information according to the frames transmitted for each image, and for realizing accounting process means with a charge system for determining the charge based on such unit charge and the amount of information of the transmitted image.

In the present embodiment, the MPEG data transmission mode is defined as a mode 1 in case of transmitting the I-frame only, a mode 2 in case of transmitting the I- and P-frames, and a mode 3 in case of transmitting the I-, P- and B-frames. In the following description, the explanation will be principally given to the parts different from those already explained in the foregoing drawings, and the explanation will not be given to the parts which are substantially same as those already explained.

FIG. 4 is a functional block diagram showing the principal parts of accounting process means in the image transmission system of the present invention, and corresponds to FIG. 1 in the first embodiment.

Accounting process means 400 is provided in the image transmission system, corresponding to the accounting process means 100 in FIG. 1.

There are also provided a control unit 401 corresponding to the control unit 101 in FIG. 1; a traffic check unit 402 corresponding to the traffic check unit 102 in FIG. 1; a transmission mode selection unit 403 corresponding to the transmission mode selection unit 103 in FIG. 1; an accounting unit 404 corresponding to the accounting unit 104 in FIG. 1; a storage unit 405 for storing the charge information of the image to be referred to by the control unit 401, and corresponding to the storage unit 105 in FIG. 1; and an image transmission system 410 corresponding to the image transmission system 110 in FIG. 1.

A measuring unit 406, absent in the foregoing first embodiment, is provided for measuring the amount of the image information transmitted or received by the image transmission system 410.

Figures 5, 6:
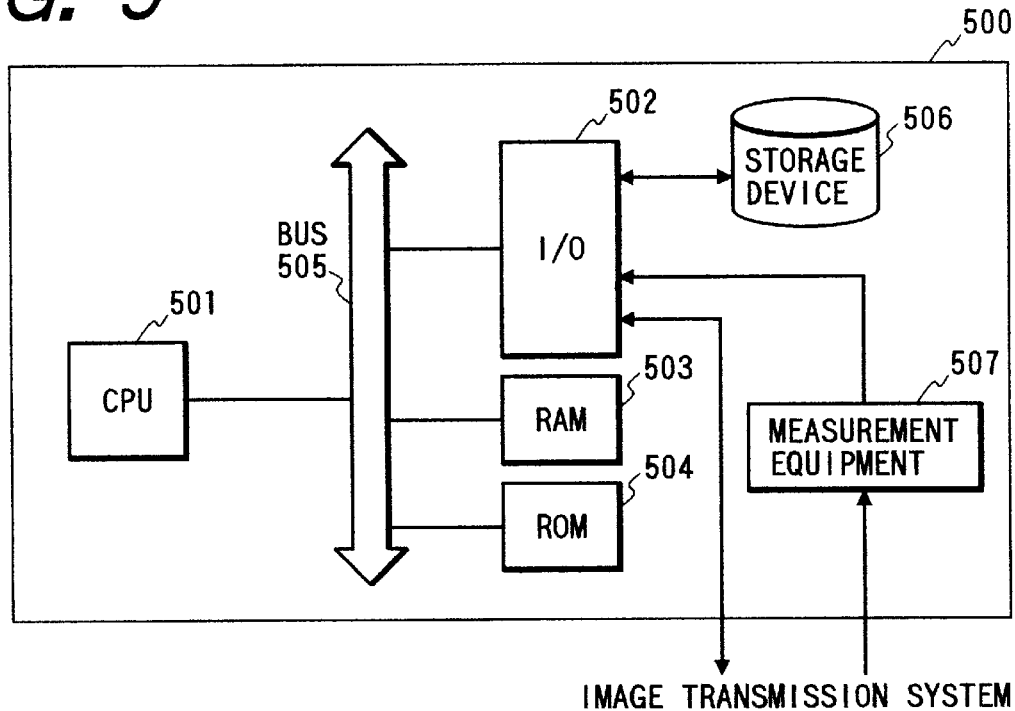
FIG. 5 is a block diagram showing a specific example of the configuration of the accounting process means in the second embodiment.
FIG. 6 is a view showing an example of the charge table to be used by the accounting process means of the second embodiment.

FIG. 6 shows an example of the charge table stored in the storage unit 402. FIG. 6 indicates, for example, the information Info 1 corresponds to a charge 11 per unit information amount when provided in the transmission mode 1, or a charge 12 per unit information amount when provided in the mode 2, or a charge 13 when provided in the mode 3.

In the following there will be explained the function of the accounting process means of the present embodiment with the charge system of determining a charge per unit information amount for each transmission mode and determining the charge based on the unit information amount and the amount of information of the image, in case a user (or a terminal of the user) requests an image Info 1 from the provider in a state where the image transmission system has an available transmission capacity Cr (C13>Cr≧C12). In the following description, the first to fourth operation sequences will be omitted as they are same as those in the first embodiment.

In the present embodiment, after the fourth operation sequence explained in the foregoing, in a fifth operation sequence, the measuring unit 406 counts the amount of the information Info 1 during the transmission thereof in the image transmission system 410, and, after the transmission of the Info 1, the accounting unit 404 determines the charge based on the unit charge 12 and the counted information amount and informs the image transmission system 410 of such determined charge.

FIG. 5 is a block diagram showing a specific example of the configuration of the accounting process means 400 shown in FIG. 4.

In FIG. 5, there are provided accounting process means 500 corresponding to that 200 in FIG. 2; a CPU 501 corresponding to that 201 in FIG. 2; an I/O interface 502 corresponding to that 202 in FIG. 2; a RAM 503 corresponding to that 203 in FIG. 2; a ROM 504 corresponding to that 204 in FIG. 2; a bus 505 for data exchange by the CPU 501—ROM 504, corresponding to the bus 205 in FIG. 2; and a storage device 506 for storing the charge for the image for each transmission mode, corresponding to that 206 in FIG. 2.

The functions of the control unit 401, the traffic check unit 402, the transmission mode selection unit 403 and the accounting unit 404 shown in FIG. 4 can be realized, in the configuration shown in FIG. 5, by the CPU 501, the I/O interface 502, the RAM 503, the ROM 504, the bus 505 and the measuring device 507 (however the measuring device 507 may be dispensed with in case of time measurement).

This is same as in the first embodiment. In the present embodiment, at an arbitrary timing in the course of image transmission, the charge at such timing is determined by a method as in the fifth operation sequence, and the accounting unit 404 informs the image transmission system of such charge.

In the following there will be explained a third embodiment of the present invention, with reference to the attached drawings.

The present embodiment is applied, in the foregoing first and second embodiments, to enable the accounting of the charge at a predetermined interval, by calculating the cumulative charge.

In the present embodiment, the MPEG data transmission mode is defined as a mode 1 in case of transmitting the I-frame only, a mode 2 in case of transmitting the I- and P-frames, and a mode 3 in case of transmitting the I-, P- and B-frames.

Figure 7:
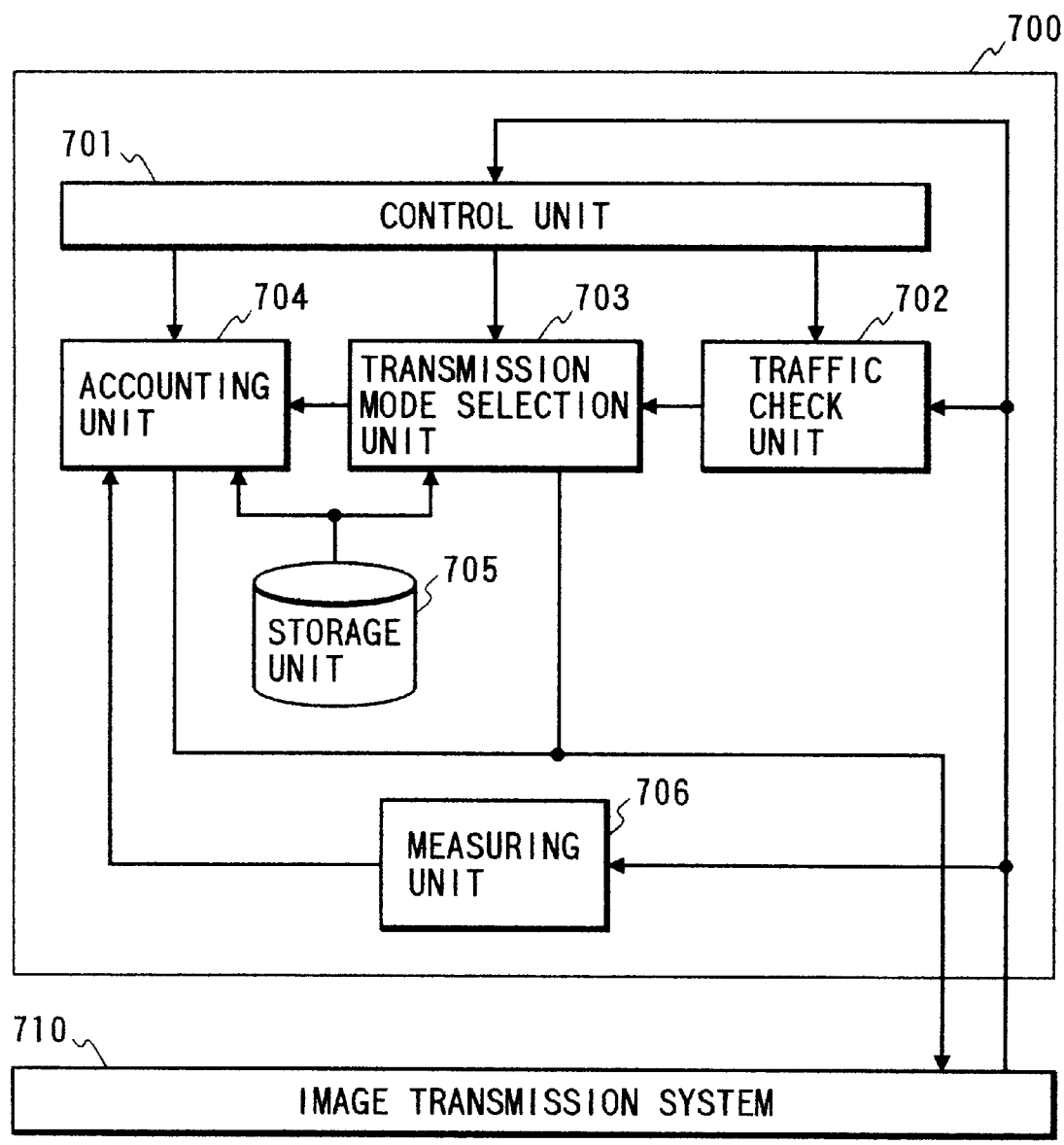
FIG. 7 is a schematic block diagram showing accounting process means of a third embodiment.

FIG. 7 is a functional block diagram showing the accounting process means in the third embodiment, wherein provided are a control unit 701 corresponding to that 401 in FIG. 1; a traffic check unit 702 corresponding to that 402 in FIG. 4; a transmission mode selection unit 703 corresponding to that 403 in FIG. 4; an accounting unit 704 corresponding to that 404 in FIG. 4; a storage unit 705 corresponding to that 405 in FIG. 4; and a measuring unit 706 corresponding to that 406 in FIG. 4.

Figure 9A:
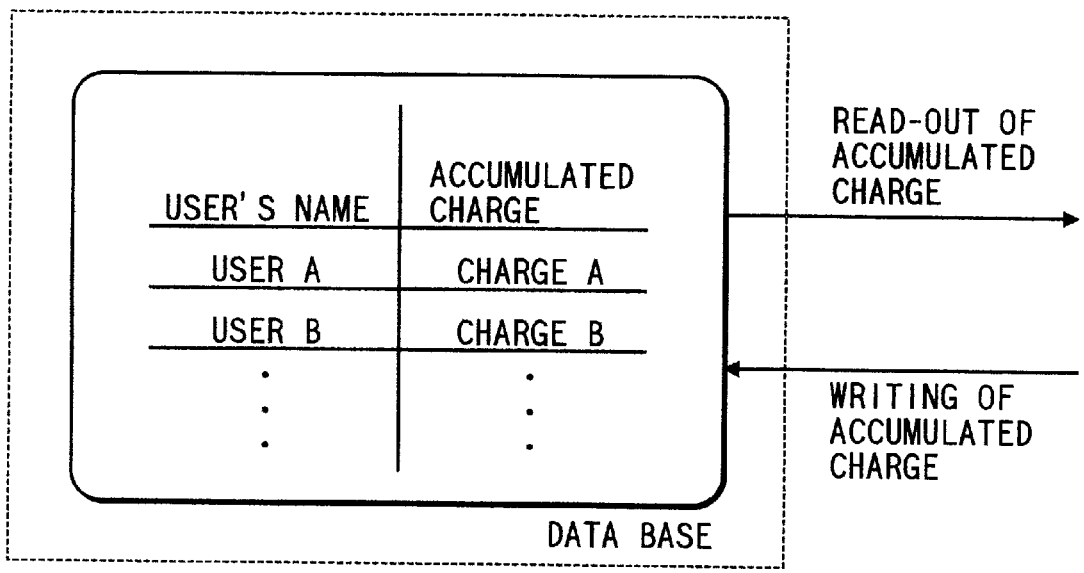
FIGS. 9A and 9B are views showing examples of the charge table to be used by the accounting process means of the third embodiment.
Figure 9B:
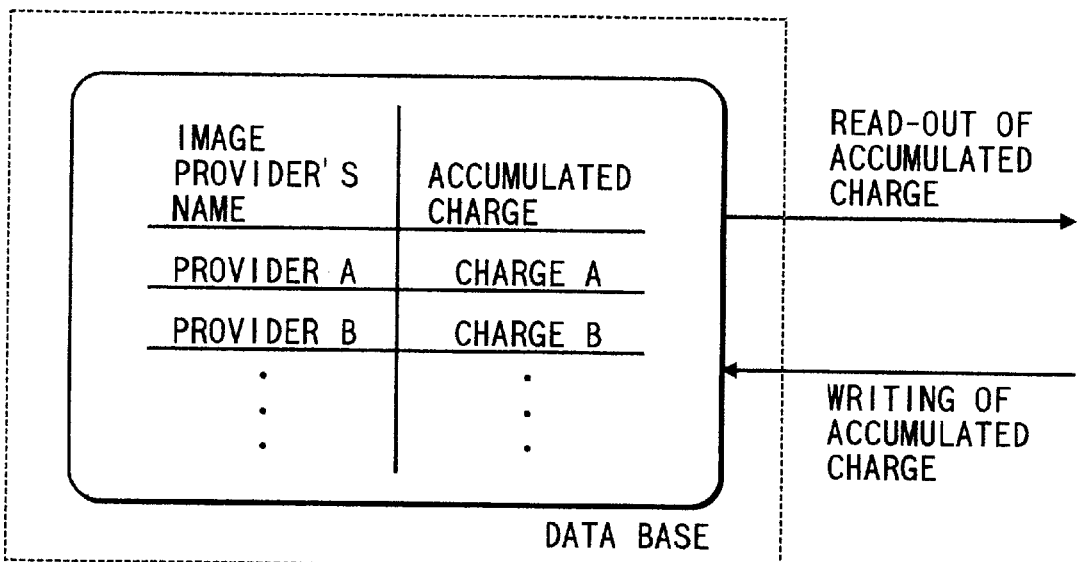

FIGS. 9A and 9B illustrate examples of an accumulated charge table stored in the storage unit 705. FIG. 9A shows the accumulated charge table in case the accounting process means 700 is provided at a terminal of the image provider side. The table shown in FIG. 9A indicates that, among the charges for the images provided to a user A, a charge A alone still remains unaccounted, and that, among the charges for the images provided to a user B, a charge B alone still remains unaccounted.

Also FIG. 9B shows the accumulated charge table in case the accounting process means is provided in a terminal at the user side. The table shown in FIG. 9B indicates that, among the charges for the images provided by a provider A, a charge A alone still remains unaccounted and that, among the charges for the images provided by a provider B, a charge B alone still remains unaccounted.

In the following there will be explained the sequence, executed by the accounting process means of the present embodiment, for determining the cumulative sum of the charges determined from the unit charge and the amount of image information, in case a user L (or a terminal of the user) requests an image Info 1 from a provider A in a state where the image transmission system has an available transmission capacity Cr (C13>Cr≧C12).

In the following description, the first to fifth operation sequences will be omitted as they are same as those explained in the foregoing.

In the present embodiment, in a sixth operation sequence after the end of the fifth operation sequence, the accounting unit 704 reads the accumulated charge for the user L from the storage unit 705, then adds the charge determined in the fifth operation sequence to the accumulated charge and stores the sum in the storage unit 705.

Figure 8:
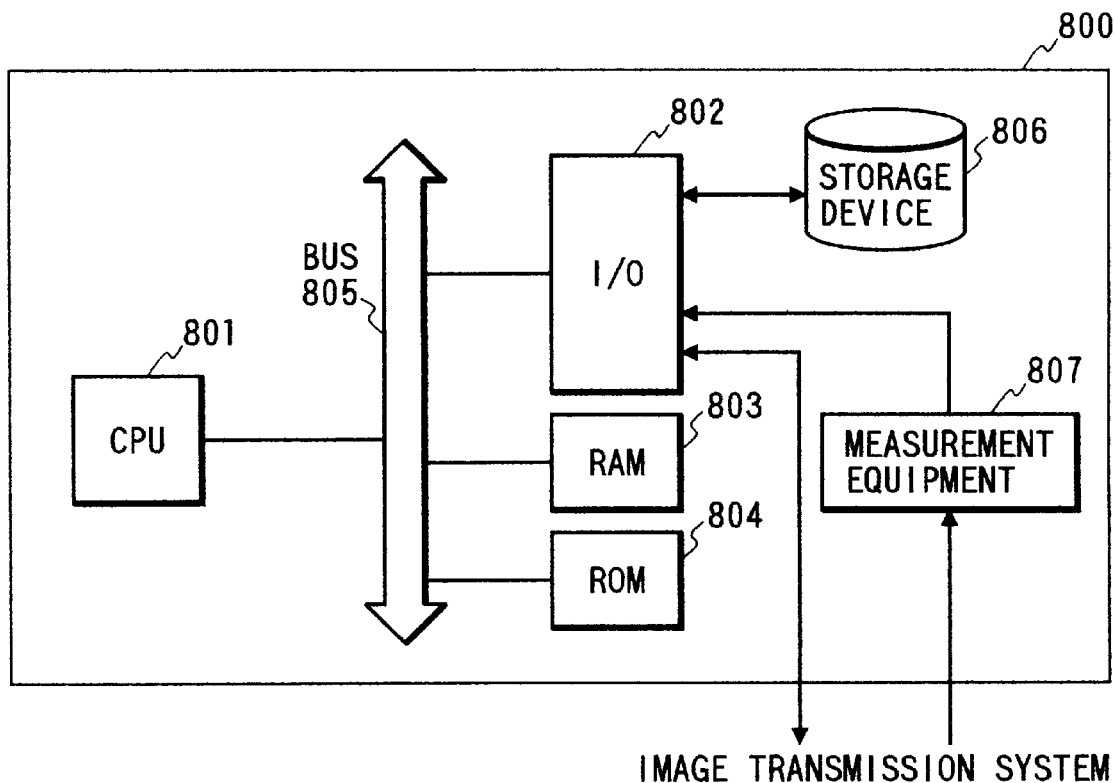
FIG. 8 is a block diagram showing a specific example of the configuration of the accounting process means in the third embodiment.

FIG. 8 is a block diagram showing a specific example of the configuration of the accounting means corresponding to FIG. 7.

In FIG. 8 there are provided accounting process means 800 corresponding to that 500 in FIG. 5; a CPU 801 corresponding to that 501 in FIG. 5; an I/O interface 802 corresponding to that 502 in FIG. 5; a RAM 803 corresponding to that 502 in FIG. 5; a ROM 804 corresponding to that 504 in FIG. 5; a bus 805 for data exchange in the CPU 801—ROM 804, corresponding to the bus 505 in FIG. 5; and a storage device 806 for storing the charges for the respective transmission modes for each image, corresponding to the storage device 506 in FIG. 5.

The functions of the control unit 701, the traffic check unit 702, the transmission mode selection unit 703 and the accounting unit 704 shown in FIG. 7 can be realized, in the configuration shown in FIG. 8, by the CPU 801, the I/O interface 802, the RAM 803, the ROM 804, the bus 805 and the measuring device 807 (however the measuring device 807 may be dispensed with in case of time measurement).

This is same as in the first embodiment. In the present embodiment, at an arbitrary timing in the course of image transmission, the charge at such timing is determined by a method as in the fifth operation sequence, and the accounting unit 704 informs the image transmission system of such charge.

In the present embodiment, the charge table is changed from the one shown in FIG. 6 to the one in FIG. 3. Then, in the fourth operation sequence, the uniform charge for each image (charge 13) is read instead of the unit charge. Then the counting of the information amount is not conducted in the fifth operation sequence, and, in the sixth operation sequence, the sum of the accumulated charge read in the fourth operation sequence and the charge 13 is set as a new accumulated charge.

Then, at an arbitrary timing in the course of image transmission, the charge at such timing is determined by a method as in the fifth operation sequence, and the accounting unit 704 informs the image transmission system of such charge.

Also the sixth operation sequence is conducted parallel to the fourth and fifth operation sequences. The fifth operation sequence does not inform the charge, and the sixth operation sequence informs the accumulated charge.

In the following there will be explained a fourth embodiment of the present invention, with reference to the attached drawings.

Figure 10:
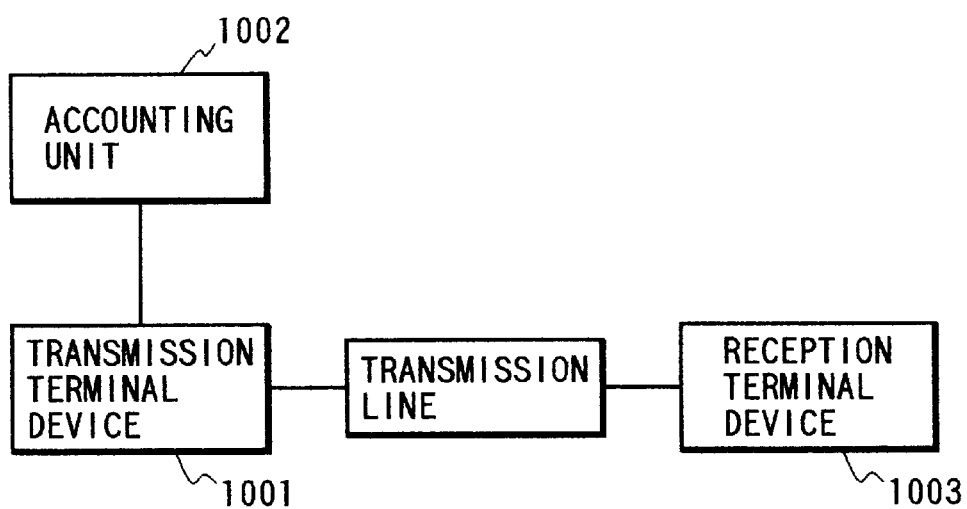
FIG. 10 is a block diagram showing the basic configuration of an image transmission system in a fourth embodiment.

FIG. 10 is a block diagram where the accounting process means in the first to third embodiments is provided at the side of the image provider (or the terminal thereof).

In the present embodiment, the MPEG data transmission mode is defined as a mode 1 in case of transmitting the I-frame only, a mode 2 in case of transmitting the I- and P-frames, and a mode 3 in case of transmitting the I-, P- and B-frames.

In FIG. 10, a transmission terminal 1001 is composed for example of a personal computer, a work station, a computer or an image transmitter of the image provider side, provided with the accounting process means.

There are also shown accounting process means 1002 shown in the foregoing first to third embodiments, and a receiving terminal 1003 composed for example of a personal computer, a work station, a computer or an image receiver of the user side.

In the following there will be explained, with reference to FIG. 11, the function of the present embodiment employing the accounting process means of the second embodiment and the apparatus therefor, in case a user L (receiving terminal 1003) requests an image Info 1 to a provider (transmitting terminal 1001) in a state where the image transmission system has an available transmission capacity Cr (C13>Cr≧C12).

At first, in a first operation sequence, the user L sends a message (image transmission requesting message) requesting the image Info 1 to the provider A through the transmission path. Upon reception of this message in the terminal 1001 of the provider A, the accounting process means 1002 fetches the message from the transmission terminal 1001.

Then, in a second operation sequence, the accounting process means 1002 inspects the traffic of the transmission path through the transmission terminal 1001 to obtain the available transmission capacity Cr, then compares the available transmission capacity Cr with C11–C13 by referring to the charge table shown in FIG. 6, thereby determining the transmission mode 2 for the transmission of the Info 1 and informs the transmission terminal 1001 of such transmission mode 2.

Then, in a third operation sequence, the transmission terminal 1001 transmits the Info 1 to the user L in the mode 2, through the transmission path. At the same time, the accounting process means 1002 measures the amount of information of the Info 1 transmitted by the transmission terminal 1001.

In a fourth operation sequence, the accounting process means 1002 monitors the Info 1 under transmission, and, upon confirming the end of transmission of the Info 1 either by detecting a bit pattern indicating the end of the image or by receiving a message from the transmission terminal 1001 to the user L, indicating the end of transmission of the Info 1, reads the unit charge 12 from the charge table shown in FIG. 6 and determines the charge to the user L, based on the amount of information of the Info 1 provided to the user L and the unit charge 12.

Then, in a fifth operation sequence, the accounting process means 1002 sends the charge, determined in the fourth operation sequence, to the transmission terminal 1001.

In a sixth operation sequence, the charge payment is executed.

The following operations are also included in the present embodiment.

At first, in the first operation sequence, the user also designates the transmission mode, at the request of the image. If the transmission capacity Cr enough for the transmission with the designated transmission mode cannot be obtained, the accounting process means either effects transmission with the designated transmission mode and with the transmission capacity Cr, or waits until a sufficient transmission capacity is obtained, or effects transmission with a transmission mode permitted within the transmission capacity Cr.

Otherwise it sends, to the image transmission apparatus, an instruction for example of cancelling the request and effects an accounting process corresponding to such instruction. At the same time the image transmitting apparatus effects a process of image transmission or request cancellation with the image receiving apparatus. The above-mentioned process options may be asked to and selected by the user.

In another operation mode, at the first operation sequence, the user also designates a terminal (or an image processing apparatus) as the destination of the image, at the request for the image to the image provider, and the provider A transmits the image information to thus designated destination.

In the third operation sequence, the unit charge 12 is read and the charge to such timing is calculated from the unit charge 12 and the amount of information up to such timing. Then the calculated charge is sent to the transmission terminal 1001 for information to the provider A and the user L.

In the fourth operation sequence, the read unit charge 12 is supplied to the transmission terminal 1001 which further transmits the unit charge 12 to the user L through the transmission path.

Then, in the fifth operation sequence, the transmission terminal 1001 informs the user L of the above-mentioned charge through the transmission path.

The accounting process means 1002 is realized by the CPU, memory, storage device etc. provided in the transmission terminal 1001.

In addition to the foregoing examples, the present embodiment also includes such variations as the application of the accounting process means of the first or third embodiment.

In the following there will be explained a fifth embodiment of the present invention, with reference to the attached drawings.

FIG. 12 is a block diagram where the accounting process means in the first to third embodiments is provided at the side of the user (or the terminal thereof).

In the present embodiment, the MPEG data transmission mode is defined as a mode 1 in case of transmitting the I-frame only, a mode 2 in case of transmitting the I- and P-frames, and a mode 3 in case of transmitting the I-, P- and B-frames.

In FIG. 12, there are shown a transmission terminal 1201 composed for example of a personal computer, a work station, a computer or an image transmitter of the image provider side, provided with the accounting process means; accounting process means 1202 shown in the foregoing first to third embodiments; and a receiving terminal 1203 composed for example of a personal computer, a work station, a computer or an image receiver of the user side.

In the following there will be explained, with reference to FIG. 13, the function of the present embodiment employing the accounting process means of the second embodiment, in case a user L (receiving terminal 1203) requests an image Info 1 to a provider A (transmission terminal 1201) in a state where the image transmission system has an available transmission capacity Cr (C13>Cr≧C12).

At first, in a first operation sequence [S1], the user L generates, within the receiving terminal 1203, a message requesting the transmission of the image Info 1 to the provider A (image transmission requesting message). The accounting process means 1202 fetches this message from the receiving terminal 1203.

Then, in a second operation sequence [S2], the accounting process means 1202 inspects the traffic of the transmission path through the receiving terminal 1203 to obtain the available transmission capacity Cr, then compares the available transmission capacity Cr with C11 to C13 by referring to the charge table shown in FIG. 6, thereby determining the transmission mode 2 for the transmission of the Info 1 and informs the receiving terminal 1203 of such transmission mode 2.

The receiving terminal 1203 informs the transmission terminal 1201, through the transmission path, of a fact that "the user L requests the transmission of the image Info 1 in the transmission mode 2 to the provider A".

Then, in a third operation sequence [S3], in response to the informing from the receiving terminal 1203, the transmission terminal 1201 transmits the Info 1 to the user L through the transmission path, in the transmission mode 2. At the same time the accounting process means 1202 measures the amount of information of the Info 1 received by the receiving terminal 1203.

Then, in a fourth operation sequence [S4], the accounting process means 1202 monitors the Info 1 under reception, and confirms the end of transmission of the Info 1 either by detecting a bit pattern indicating the end of the image or by receiving a message from the receiving terminal 1203 indicating the end of reception of the Info 1 from the provider A.

Upon confirming the end of reception in the above-explained manner, the accounting process means 1202 reads the unit charge 12 from the charge table shown in FIG. 6, then determines the charge to be charged by the provider A, based on the amount of information of the Info 1 received from the provider A and the unit charge 12, and transmits such charge to the receiving terminal 1203.

In a fifth operation sequence [S5], the charge payment is executed.

The following case is also included in the present embodiment.

At first, in the first operation sequence, the user also designates the transmission mode, at the request of the image.

If the transmission capacity Cr enough for the transmission with the designated transmission mode cannot be obtained, the accounting process means 1202 effects transmission with the designated transmission mode and with the available transmission capacity Cr, or waits until a sufficient transmission capacity is obtained, or effects transmission with a transmission mode permitted within the transmission capacity Cr.

Otherwise it sends, to the image receiving apparatus, an instruction for example of cancelling the request and effects an accounting process corresponding to such instruction. At the same time the image receiving apparatus effects a process of image transmission or requests cancellation in cooperation with the image transmission apparatus.

The above-mentioned process options may be asked to and selected by the user.

In another operation mode, at the first operation sequence, the user also designates a terminal (or an image processing apparatus) as the destination of the image, at the request for the image to the image provider, and the image provider A transmits the image information to thus designated destination. This operation includes following two cases.

In a first case, the accounting process means belongs to the user. In this case, the user (or the accounting process means thereof) receives a notice indicating the start of image transmission from the destination or the image provider, at the start of image providing prior to the third operation sequence, and initiates the accounting process.

Also in the fourth operation sequence, the accounting operation is terminated in response to a notice indicating the end of image transmission. Also the amount of image information is informed to the user from the destination or the image provider.

In a second case, the accounting process means belongs to the destination designated by the user. In this case, the user sends, in the first operation sequence, the image transmission requesting message also to the destination, of which accounting process means fetches this message. The accounting process means of the destination informs the provider or the user of the charge in the fourth operation sequence.

In the first operation sequence, the receiving terminal 1203 transmits the image transmission requesting message, and the transmission terminal 1201 selects the transmission mode 2 in the same manner as in the accounting process means 1202.

In the third operation sequence, the unit charge 12 is read, then the charge to such timing is calculated, based on the unit charge 12 and the amount of information Info 1 received up to such timing, and thus calculated charge is supplied to and displayed on the receiving terminal 1203, as information to the user L.

In addition, the present embodiment also includes such variations as realizing the accounting process means 1202 by means of the CPU, memory, storage device etc. provided in the receiving terminal 1203, or as applying the accounting process means of the first or third embodiment.

In the following there will be explained a sixth embodiment of the present invention, with reference to the attached drawings.

FIG. 14 is a block diagram where the accounting process means in the first to third embodiments is provided both at the image provider (or the terminal thereof) and at the user (or the terminal thereof).

In the present embodiment, the MPEG data transmission mode is defined as a mode 1 in case of transmitting the I-frame only, a mode 2 in case of transmitting the I- and P-frames, and a mode 3 in case of transmitting the I-, P- and B-frames.

In FIG. 14, there are shown a transmission terminal 1401 composed for example of a personal computer, a work station, a computer or an image transmitter of the image provider side, provided with the accounting process means; accounting process means 1402 shown in the foregoing first to third embodiments; a receiving terminal 1403 composed for example of a personal computer, a work station, a computer or an image receiver of the user side provided with the accounting process means; and accounting process means 1404 shown in the foregoing first to third embodiments.

In the following there will be explained, with reference to FIG. 15, the function of the present embodiment employing the accounting process means of the second embodiment and the apparatus therefor, in case a user L (receiving terminal 1403) requests an image Info 1 to a provider A (transmission terminal 1401) in a state where the image transmission system has an available transmission capacity Cr (C13>Cr≧C12).

At first, in a first operation sequence [S1], the user L transmits, to the provider A (transmission terminal 1401) through the transmission path, a message requesting the transmission of the image Info 1 (image transmission requesting message). The accounting process means 1404 fetches this message from the receiving terminal 1403. Also when the message is received by the transmission terminal 1401, the accounting process means 1402 thereof fetches the message from the transmission terminal 1401.

Then, in a second operation sequence [S2], the accounting process means 1402 inspects the traffic of the transmission path through the transmission terminal 1401 to obtain the available transmission capacity Cr, then compares the available transmission capacity Cr with C11 to C13 by referring to the charge table shown in FIG. 6, thereby determining the transmission mode 2 for the transmission of the Info 1 and informs the transmission terminal 1401 of such transmission mode 2.

Similarly the accounting process means 1404 determines the transmission mode 2 and informs the receiving terminal 1403 of such mode.

Then, in a third operation sequence [S3], the transmission terminal 1401 transmits the Info 1 through the transmission path to the receiving terminal 1403 in the transmission mode 2. The accounting process means 1402 measures the amount of the information Info 1 transmitted by the transmission terminal 1401.

The receiving terminal 1403 receives the Info 1, transmitted through the transmission path. The accounting process means 1404 measures the amount of the information Info 1 received by the receiving terminal 1403.

Then, in a fourth operation sequence [S4], the accounting process means 1402 monitors the Info 1 under transmission, and, upon confirming the end of transmission of the Info 1 to the user L either by detecting a bit pattern indicating the end of the image or by receiving a message from the transmission terminal 1401 indicating the end of transmission of the Info 1 to the user L, reads the unit charge 12 from the charge table shown in FIG. 6. It then calculates the charge to the user L, based on the unit charge 12 and the amount of information Info 1 provided to the user L, and informs the transmission terminal 1401 of such charge. Also the accounting process means 1404 monitors the Info 1 under reception, and, upon confirming the end of reception of the Info 1 from the provider A either by detecting a bit pattern indicating the end of the image or by receiving a message from the receiving terminal 1403 indicating the end of reception of the Info 1 from the provider A, reads the unit charge 12 from the charge table shown in FIG. 6.

It then calculates the charge, to be charged by the provider A, based on the unit charge 12 and the amount of the information Info 1 received from the provider A, and informs the receiving terminal 1403 of such charge.

In a fifth operation sequence [S5], the charge payment is executed.

The following case is also included in the present embodiment.

At first, in the first operation sequence [S1], the user also designates the transmission mode, at the request of the image.

If the transmission capacity Cr enough for the transmission with the designated transmission mode cannot be obtained, the accounting process means 1402 (or 1404) effects transmission with the designated transmission mode and with the available transmission capacity Cr, or waits until a sufficient transmission capacity is obtained, or effects transmission with a transmission mode permitted within the transmission capacity Cr.

Otherwise it sends, to the image transmission apparatus (or image receiving apparatus in case of the accounting process means 1404), an instruction for example of cancelling the request and effects an accounting process corresponding to such instruction. At the same time, the image transmission apparatus and the image receiving apparatus effect a process of image transmission or request cancellation according to such instruction. The above-mentioned process options may also be asked to and selected by the user.

In another operation mode, at the first operation sequence, the user also designates a terminal (or an image processing apparatus) as the destination of the image, at the request for the image to the image provider, and the image provider A transmits the image information to thus designated destination. This operation includes following two cases.

In a first case, both the provider and the user are provided with the accounting process means. In this case, the user (or the accounting process means thereof) receives a notice indicating the start of image transmission from the destination or the image provider, at the start of image providing prior to the third operation sequence, and initiates the accounting process. Also in the fourth operation sequence, the accounting operation is terminated in response to a notice indicating the end of image transmission. Also the amount of image information is informed to the user from the destination or the image provider.

In a second case, the accounting process means are provided both at the provider and the destination designated by the user. In this case, the user sends, in the first operation sequence, the image transmission requesting message also to the destination, of which accounting process means fetches this message. The accounting process means of the destination may inform the user of the charge in the fourth operation sequence [S4].

Also in the second operation sequence [S2], the accounting process means 1402 reads the unit charge 12, and informs it to the transmission terminal for display thereon for the provider A.

Also in the second operation sequence [S2], the accounting process means 1404 reads the unit charge 13, and informs it to the receiving terminal 1403 for display thereon for the user L.

In the third operation sequence, the accounting process means 1404 reads the unit charge 12, then calculates the current charge based on the unit charge 12 and the amount of the information Info 1 received up to such timing, and sends such charge to the receiving terminal 1403.

It is also possible to realize the accounting process means 1402 by means of the CPU, memory, storage device etc. provided in the transmission terminal 1401, to realize the accounting process means 1404 by means of the CPU, memory, storage device etc. provided in the receiving terminal 1403, or to apply the accounting process means of the first or third embodiment.

The networks utilizing the accounting process means explained in the foregoing constitute embodiments of the present invention, but a particularly preferred embodiment utilizing the accounting process means of the present invention will be explained in the following.

Now a seventh embodiment of the present invention will be explained with reference to the attached drawings.

Figure 16:
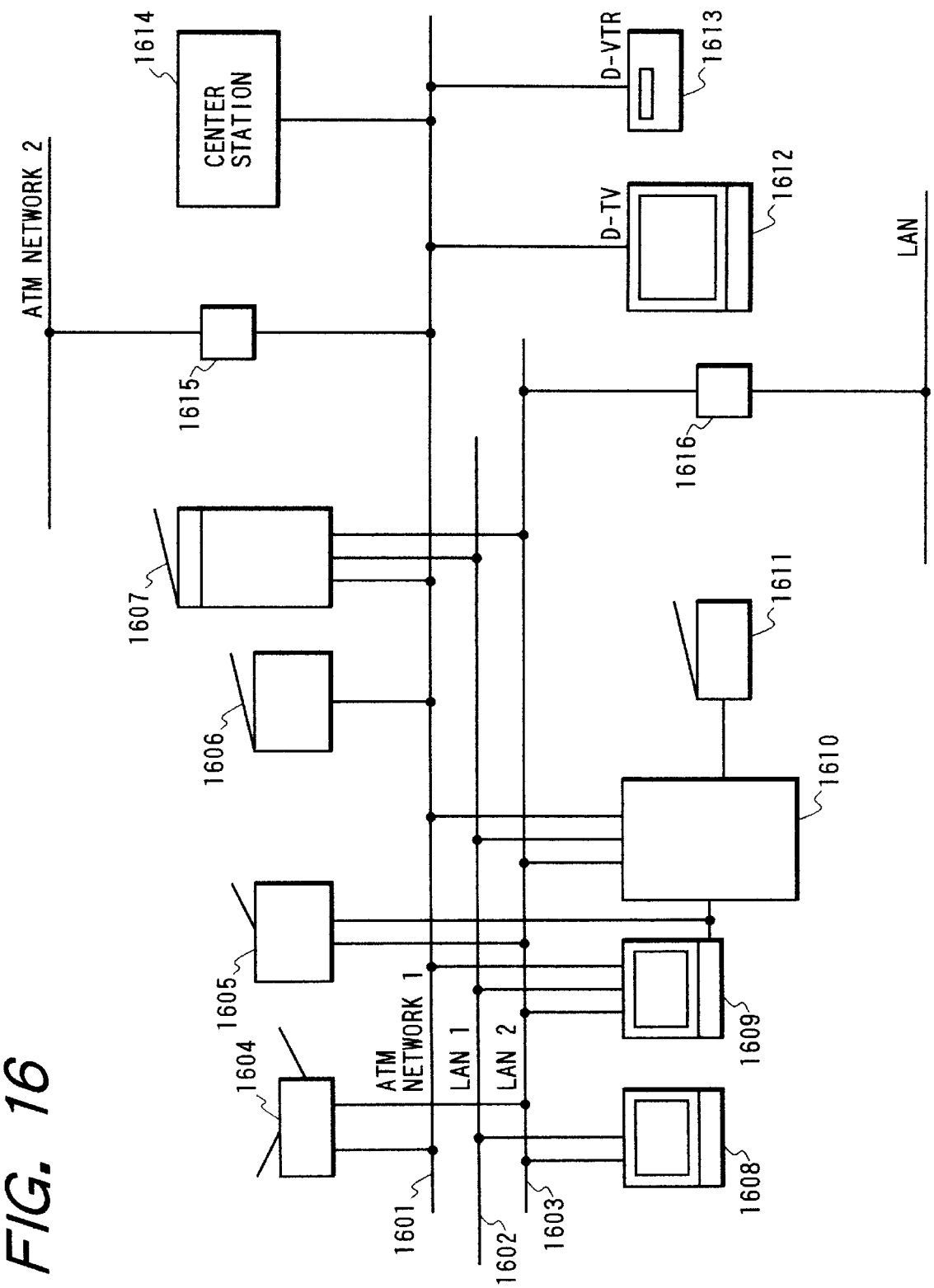
FIG. 16 is a view showing a system in a seventh embodiment.

FIG. 16 is a block diagram showing the entire configuration of a network of the present embodiment.

In FIG. 16 there is shown an ATM network 1601 for data transmission with an ATM (asynchronous transfer mode) to be explained later.

There are also shown local area networks (LAN) 1602, 1603, composed for example of Ethernet, for data transfer in modes other than the ATM. These networks 1601, 1602, 1603 are connected to following various apparatus.

There are shown a facsimile apparatus 1604, a color printer 1605 provided therein with a page memory, a color copying apparatus 1606 including a color scanner, a color printer, a page memory for storing the original image data read by the color scanner, and a circuit for reading the image data from the page memory for supply to the color printer, a file server 1607 for temporarily storing the image data entered through the ATM network, and a work station 1608 for data input/output of the file server.

A terminal 1609 connected to the ATM network also effects data exchange with the local area networks 1602, 1603 and effects various processing such as image data editing. The terminal 1609 is connected to the printer 1605 etc. mentioned above, through the network 1603 or exclusive lines.

A server 1610, similar to the server 1607, is connected to a color copying apparatus 1611 which is similar to the color copying apparatus 1606.

A digital television 1612, connected to the ATM network receives data therethrough and displays such received data.

There are also shown a VCR 1613 receiving the image data through the ATM network; a center station 1614 such as a CATV station for sending various software data and image data to the ATM network; a first router 1615 for connecting the ATM network to another ATM network; and a second router 1616 for connection with another local area network.

Also unrepresented ATM network switches are provided between the ATM network and the equipment connected thereto, such as the facsimile apparatus 1604, the printer 1605 and the color copying apparatus 1607. These equipment are provided, if necessary, with the accounting process means as shown in the foregoing first to third embodiments.

Figure 17:
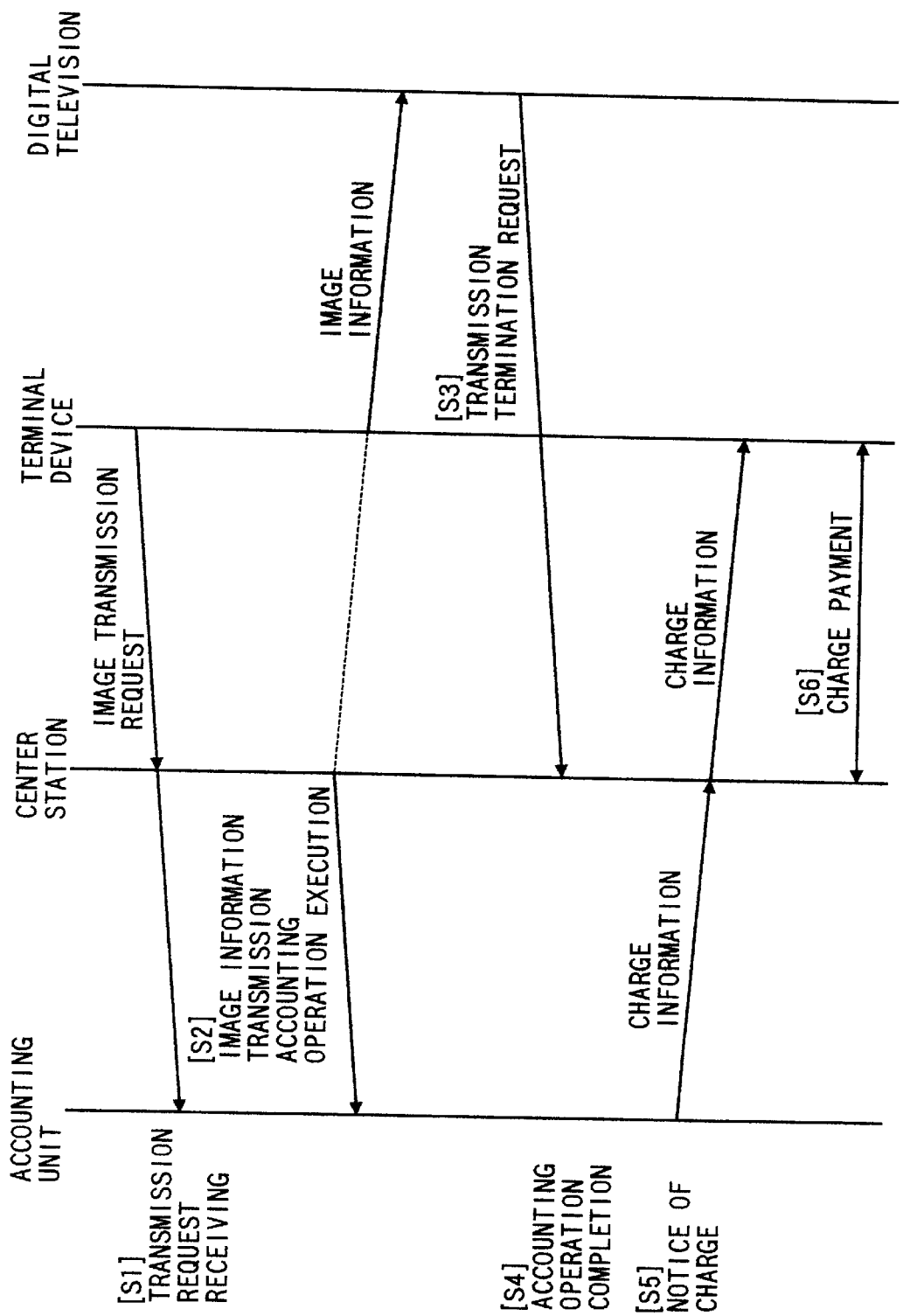
FIG. 17 is a view showing the accounting process in the system of the seventh embodiment.

The accounting operation in the above-explained configuration will be explained in the following with reference to FIG. 17, in case the center station 1614 is provided with the accounting process means (fourth embodiment) and the user terminal 1609 sends the request to the transmission center station 1614, designating the digital television 1612 as the destination of the image.

At first, in a first operation sequence [S1], the terminal 1609 sends a request for transmission to the center station 1614, designating the requested image, the transmission mode therefor and the digital television 1612 as the destination. The accounting process means fetches his request from the center station 1614, which has received this request.

Then, in a second operation sequence [S2], the center station 1614 transmits the image data to the digital television 1612, which receives thus transmitted data. In this sequence, the accounting operation is executed as explained in the foregoing fourth embodiment, whereby the charge to be paid by the terminal 1609 (or the user thereof) to the center station 1614 is derived.

Then, in a third operation sequence [S3], if the terminal 1609 or the digital television 1612 wishes to terminate the data reception in the course thereof, a request for terminating the transmission is sent to the center station 1614.

Then, in a fourth operation sequence, in response to such request for terminating the transmission, the center station 1614 terminates the supply of the image data. Detecting such termination, the accounting process means terminates the accounting operation.

Then, in a fifth operation sequence [S5], the center station 1614 informs the terminal 1609 of the charge derived by the accounting process means.

In a sixth operation sequence [S6], the charge payment is executed between the center station 1614 and the terminal 1609. In case of bidirectional data transfer, the accounting is similarly executed with the inversion of the transmitting and receiving sides.

The present embodiment also includes the following cases.

In case the accounting process means is not provided in the center station 1614 but in the terminal 1609, in the first operation sequence [S1], the accounting process means fetches the request for transmission from the terminal 1609.

Also at the start of image providing, a message therefor is transmitted from the center station 1614 or the digital television 1612 to the terminal 1609, and, at the end of the image providing, a message therefor is transmitted from the center station 1614 or the digital television 1612 to the terminal 1609.

Upon detecting the message indicating the start of image providing, the accounting process means initiates the accounting operation as in the fourth embodiment, and, upon detecting the message indicating the end of image providing, terminates the accounting operation. In such case, the fifth operation sequence [S5] in this embodiment is omitted.

In case the accounting process means is not provided in the center station 1614 or the terminal 1609 but in the digital television 1612, in the first operation sequence [S1], the accounting process means fetches the request for transmission from the digital television 1612.

The accounting operation is conducted as explained in the foregoing fifth embodiment, and, in the fifth operation sequence [S5] of the present embodiment, the charge is informed from the digital television 1612 to the center station 1614 and/or the terminal 1609.

Also the function in case the accounting process means are provided at least in both the center station 1614 and the terminal 1609 will be apparent from the sixth embodiment. It will thus be apparent that the accounting on the data exchange can be achieved not only between the center station and the digital television but also among other terminals.

In the following there will be explained an eighth embodiment of the present invention, with reference to the attached drawings.

Figure 18:
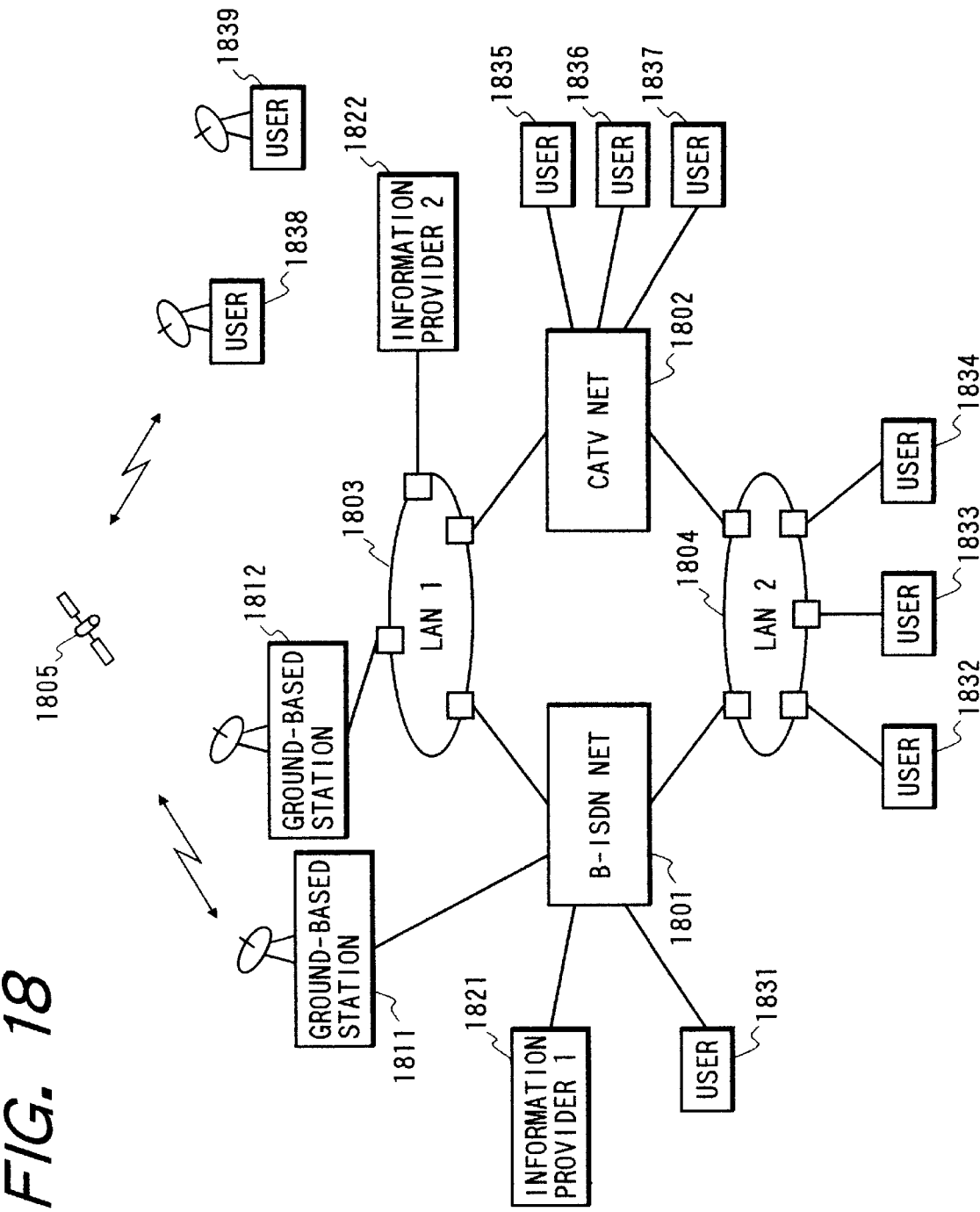
FIG. 18 is a view showing a system in an eighth embodiment.

FIG. 18 is a view showing an example of the multimedia network system in which the present invention is applicable, wherein shown are a B-ISDN network 1801 utilizing high-speed public lines; a cable television (CATV) network 1802; local area networks (LAN) 1803, 1804; and a communication satellite 1805.

There are also shown ground stations 1811, 1812 for effecting information communication through the communication satellite; information providers 1821, 1822 providing various multimedia information including image and voice information through such communication networks and receiving the charges therefor; and users 1831 to 1839 utilizing the information provided from the information providers and paying the charges therefor.

The B-ISDN network 1801, the CATV network 1802, the LAN's 1803, 1804 and the communication satellite 1805 are mutually connected to enable mutual (bidirectional) information exchange. The information providers 1821, 1822 and the users 1831 to 1839 are respectively connected to these communication networks. The information providers 1821, 1822 are respectively provided with the accounting process means as shown in the foregoing first to third embodiments.

However, since the bidirectional communication is possible, the information provider may become a user and the user may become an information provider if the accounting process means are provided both in the information providers 1821, 1822 and in the users 1831 to 1839. Also the above-mentioned accounting process means may be incorporated in each equipment, or provided between each equipment and the network, or externally attached to each equipment.

Figure 19:
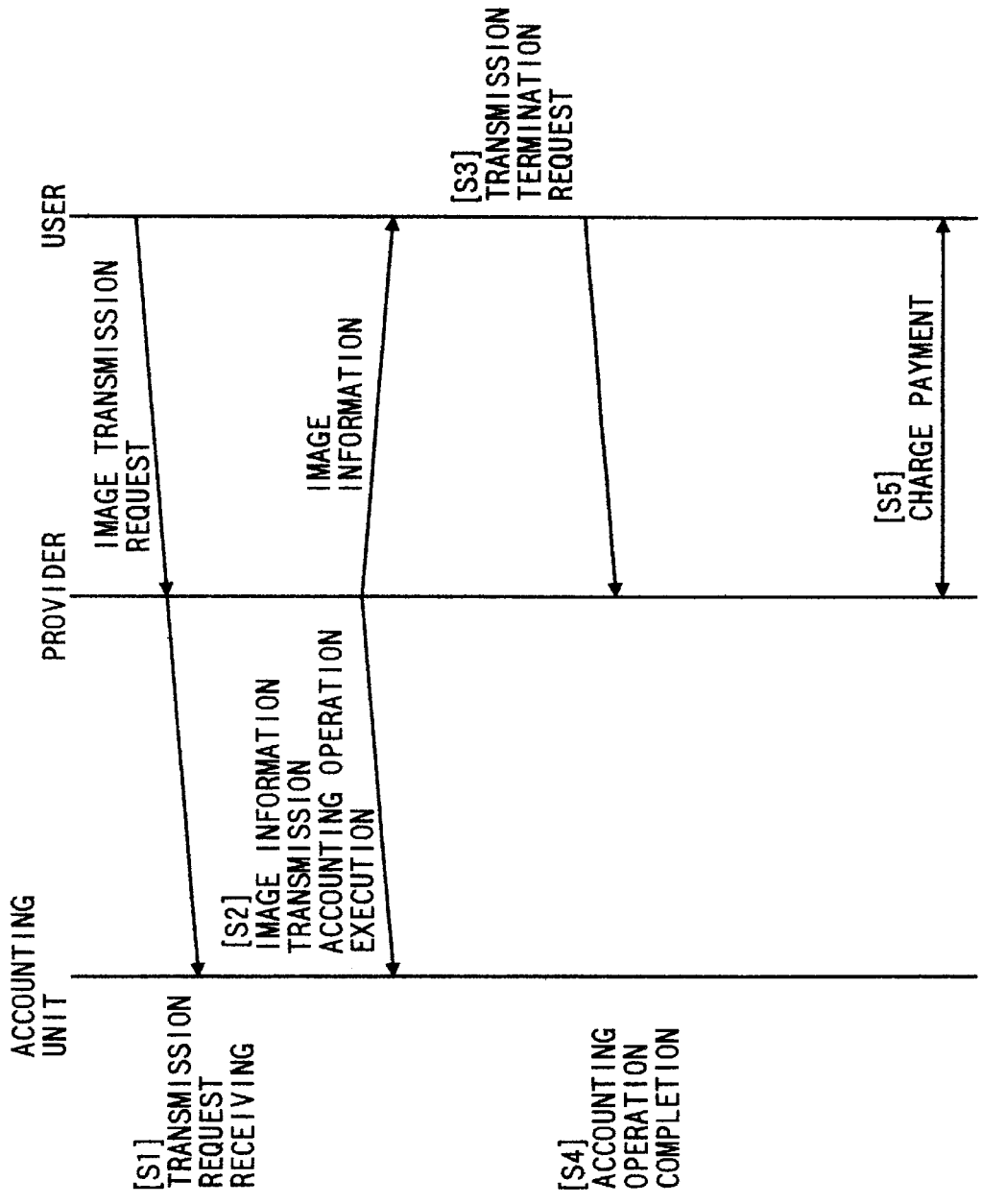
FIG. 19 is a view showing the accounting process in the system of the eighth embodiment.

The function of the present embodiment will be explained in the following, with reference to FIG. 19, in case the information providers alone are provided with the accounting process means, taking a case that the user 1839 requests the information from the provider 1821 and the provider 1821 charges to the user 1839 according to the information provided thereto.

In the following description, the transmission path indicates the second LAN 1804, the B-ISDN network 1801, the CATV network 1802 and the first LAN 1803.

At first, in a first operation sequence [S1], the user 1839 sends a request for the image transmission, to the information provider 1821 through the transmission path.

Then, in a second operation sequence [S2], in response to the request from the user 1839, the provider 1821 provides the user 1839 with the MPEG encoded image information through the transmission path. In this operation, there is executed the accounting operation as already explained in the fourth embodiment.

Then, in a third operation sequence [S3], the user 1839, if wishing to interrupt the image transmission in the course thereof, sends a request for terminating the transmission.

In a fourth operation sequence [S4], in response to such request, the information provider terminates the image transmission. Also the accounting process means terminates the accounting operation mentioned above.

Then in a fifth operation sequence [S5], the charge payment is executed. In case the user is provided with the accounting process means is the above-explained network, the function of the accounting process means is conducted according to the fifth embodiment. Also in case the provider and the user have the accounting process means, the function is conducted as in the sixth embodiment.

As will be apparent from the foregoing, the accounting to other users or other providers is similarly possible.

In the following there will be explained a ninth embodiment of the present invention.

In the transmission of information (image requesting signal, image information, accounting information etc.) between a transmitting station and a receiving station through a transmission path, there may result illegal deeds such as:

1. Reception of the image information by a third party without charge payment;
2. Request for and reception of the information by a third party pretending another receiving station;
3. Alteration of the charge-requesting information by the receiving station, after the reception of the information; and
4. Forgery of the receipt information by the receiving station, without charge payment.

As a countermeasure for such illegal deed, following cypher means may be combined with the accounting process means as shown in the first to eighth embodiments or the system utilizing the same.

In such case, in the configuration shown in FIGS. 10, 12 or 14, the cypher means explained in the following may be provided on the transmission terminal and the receiving terminal.

It is also possible to assign encypher/decyphering means to each hierarchic layer of the image data and to include the operation time of such encypher/decyphering means and the amount of image information processed by the encypher/decyphering means in the charge calculation.

In the following there will be explained a tenth embodiment of the present invention. In contrast to the foregoing embodiments in which the necessary frames alone are transmitted, the present embodiment transmits all the frames of the MPEG data. The receiving side (user) only decodes the necessary frames, and the accounting is conducted according to thus decoded frames.

Consequently, in the present embodiment, the accounting process means is principally provided in the receiving side. In the present embodiment, the MPEG data decoding mode is defined as a mode 1 in case of decoding the I-frame only, a mode 2 in case of decoding the I- and P-frames, and a mode 3 in case of decoding the I-, P- and B-frames.

The accounting means in the present embodiment is substantially same as that in any of the foregoing embodiments, but is adapted to:

1) manage the above-mentioned decoding modes instead of the transmission modes; and
2) effect the accounting process by detecting the decoding mode, by monitoring the decoding mode employed by the user for decoding the MPEG data.

Also MPEG decoding means for decoding the MPEG data with a designated decoding mode can be realized with a known MPEG decoding device. The present embodiment also includes a case where the accounting means is provided at the transmission side.

In the following there will be explained an eleventh embodiment of the present invention. In the transmission of information (image requesting signal, image information, accounting information etc.) between a transmitting station and a receiving station through a transmission path, there may result illegal deeds such as:

1. Reception of the image information by a third party without charge payment;
2. Request for and reception of the information by a third party pretending another receiving station;
3. Alteration of the charge-requesting information by the receiving station, after the reception of the information; and
4. Forgery of the receipt information by the receiving station, without charge payment.

As a countermeasure for such illegal deed, following cypher means may be combined with the accounting process means as shown in the first to tenth embodiments. In such case, in the configuration shown in FIGS. 12, 14 or 16, the cypher means explained in the following may be provided in the transmission terminal and the receiving terminal.

In the present embodiment, the MPEG data decoding mode is defined as a mode 1 in case decoding the I-frame only, a mode 2 in case of decoding the I- and P-frames, and a mode 3 in case of decoding the I-, P- and B-frames.

In particular the present embodiment, utilizing the foregoing first to tenth embodiment, is capable not only of encyphering the MPEG data for transmission but also of realizing the following accounting system.

Figure 22:
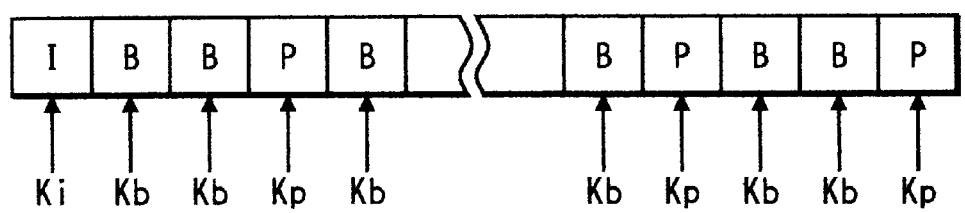
FIG. 22 is a view showing a key sequence in encyphering MPEG data.

At first, as shown in FIG. 22, the transmitting side encyphers the I-frame with a cypher key Ki, the P-frame with a key Kp and the B-frame with a key Kb.

In case the user (or the terminal thereof) wishes the mode 1, the transmitting side informs the user of the key Ki or a decyphering key corresponding thereto.

In case the user wishes the mode 2, the transmitting side informs the user of the keys Ki and Kp or decyphering keys corresponding thereto.

In case the user wishes the mode 3, the transmitting side informs the user of the keys Ki and Kp and Kb, or decyphering keys corresponding thereto, and then the encyphered MPEG data are transmitted. In this operation, the transmitting side executes an accounting process corresponding to the decyphering keys informed to the user.

The present embodiment also includes a case in which the amount of information subjected to the decyphered operation, the number of encyphering or decyphering operations, the operation time of the encyphering or decyphering means etc. are reflected on the charge.

Also in order to always inform only one key to the user, for the user wishing the mode 1, the transmitting side encyphers the I-frame with a cypher key K1 and the I- and P-frames with a key K2 and informs the user of the key K1 or a decyphering key corresponding thereto.

Also for the user wishing the mode 2, the transmitting side encyphers the I- and P-frames with a key K1 and the B-frame with a key K2, and informs the user of the key K1 or a decyphering key corresponding thereto. For the user wishing the mode 3, the transmitting side encyphers the I-, P- and B-frames with a key K and informs the user of the key K or a decyphering key corresponding thereto. Such operation mode is also included in the present embodiment.

The cypher technology can be generally classified into a common key cypher system and an open key cypher system to be explained in the following.

In the common key cypher system, a same cypher key is secretly owned by the transmitter and the receiver (also called secret key cypher system, symmetrical cypher system etc.).

The common key cypher system can be classified into a block cypher in which the encyphering is executed with a same key for every block of characters of a suitable length, and a stream cypher in which the key is changed for every block of characters or for every bit. In the above-mentioned block cypher, there are known a mutation cypher in which the encyphering is achieved by mutating the order of characters, and a replacement cypher in which each character is replaced by another character.

In these cypher systems, a correspondence table for mutation or replacement constitutes the cypher key. In the stream cypher, there are known Visinel code employing multiple tables, and Vernum code employing a key used only once. (Details of these cypher systems are described by Ikeno and Oyama, "Modern cypher theory", Electronic Information Communication Association, 1986, Chapters 2 and 4.)

Among the block cypher systems, some systems of which algorithms are already disclosed, such as DES (Data Encryption Standard) or FEAL (Fast data Encipherment Algorithm) are widely used as the commercial cypher systems. (For details, see Tsujii, Kasahara, "Cypher and information security", Shokodo, 1990, Chapter 2.)

The open key cypher system employs an encyphering key and a decyphering key which are mutually different, where in the encyphering key is made open but the decyphering key is kept secret. Such open key cypher system is featured by:

1) As the encyphering key is different from the decyphering key and can be made open, the delivery of the key is made easy;
2) As the encyphering key of each user is made open, each user is only required to keep the decyphering key secret; and
3) There can be realized a confirming function, for the receiver to confirm that the transmitter of the transmitted text is true and that the transmitted text has not been altered. Such function is also called digital signature, for which there have already proposed various systems, such as RSA code, R code, W code, MI code, MH code, GS code, CR code, M code, E code, T code, S code, L code, GMY code, GMR code, OSS code and OS code. (for details, see Ikeno, Oyama, "Modern Cypher Theory", Electronic Information Communication Association, 1986, Chapters 5 to 8.)

The foregoing embodiments, setting the frame of the MPEG data according to the traffic of the transmission path and calculating the charge for the image according to the content of thus set frame, can realize an accounting system exploiting the kind and quality of the information and the service, thereby being adaptable to various information and services.

Also according to another feature, the accounting process can be executed with a charge system in consideration of the amount of image information, in addition to the content of the transmitted frame.

Also according to sill another feature, the accounting can be executed corresponding to the hierarchic encoding technology.

What is claimed is:

1. An image transmission system for transmitting MPEG data through a transmission path, comprising:
   a) means for selectively setting kinds of frames for the MPEG data to be transmitted; and
   b) accounting means for effecting an accounting process with a charge system according to thus set frames.

2. An image transmission system according to claim 1, wherein said accounting process means is provided in the transmitting side.

3. An image transmission system according to claim 1, wherein said accounting process means is provided in the receiving side.

4. An image transmission system according to claim 1, wherein said accounting process means is provided both in the transmitting side and in the receiving side.

5. An image transmission system according to claim 1, further comprising charge payment means for paying the charge at a predetermined interval.

6. An image transmission system according to claim 5, wherein said accounting process means is provided in the transmitting side.

7. An image transmission system according to claim 5, wherein said accounting process means is provided in the receiving side.

8. An image transmission system according to claim 5, wherein said accounting process means is provided both in the transmitting side and in the receiving side.

9. An image transmission system according to claim 5, further comprising cypher means for effecting at least encyphering or digital signature on said transmitted information.

10. An image transmission system according to claim 1, further comprising cypher means for effecting at least encyphering or digital signature on said transmitted information.

11. An image transmission system for transmitting MPEG data through a transmission path, between a transmitting terminal and a receiving terminal, comprising:
   a) a receiving terminal provided with frame setting means for selectively setting kinds of frames for the MPEG data to be transmitted; and
   b) a transmitting terminal provided with accounting process means for effecting an accounting process with a predetermined charge system, and image charge information storage means for storing charge information for the image, to be used in said accounting process.

12. An image transmission system according to claim 11, wherein said accounting process means is provided both in the transmitting side and in the receiving side.

13. An image transmission system according to claim 11, further comprising charge payment means for paying the charge at a predetermined interval.

14. An image transmission system according to claim 13, wherein said accounting process means is provided in the transmitting side.

15. An image transmission system according to claim 13, wherein said accounting process means is provided both in the transmitting side and in the receiving side.

16. An image transmission system according to claim 13, further comprising cypher means for effecting at least encyphering or digital signature on said transmitted information.

17. An image transmission system according to claim 11, further comprising cypher means for effecting at least encyphering or digital signature on said transmitted information.

18. An image transmission system for transmitting MPEG data through a transmission path, comprising:
   a) frame setting means for selectively setting the kinds of frames for MPEG data to be transmitted, according to the traffic in said transmission path; and
   b) accounting processing means for effecting an accounting process with a charge system according to the kinds of frames and the amount of information of said MPEG data.

19. An image transmission system according to claim 18, wherein said accounting process means is provided in the transmitting side.

20. An image transmission system according to claim 18, wherein said accounting process means is provided in the receiving side.

21. An image transmission system according to claim 18, wherein said accounting process means is provided both in the transmitting side and in the receiving side.

22. An image transmission system according to claim 18, further comprising charge payment means for paying the charge at a predetermined interval.

23. An image transmission system according to claim 22, wherein said accounting process means is provided in the transmitting side.

24. An image transmission system according to claim 22, wherein said accounting process means is provided in the receiving side.

25. An image transmission system according to claim 22, wherein said accounting process means is provided both in the transmitting side and in the receiving side.

26. An image transmission system according to claim 22, further comprising cypher means for effecting at least encyphering or digital signature on said transmitted information.

27. An image transmission system according to claim 18, further comprising cypher means for effecting at least encyphering or digital signature on said transmitted information.

28. An image transmission system for transmitting MPEG data through a transmission path, comprising:
   a) traffic check means for checking the traffic in said transmission path;
   b) frame setting means for selectively setting the kinds of frames for MPEG data to be transmitted, according to the traffic in said transmission path;
   c) accounting processing means for effecting an accounting process with a charge predetermined system;
   d) information measuring means for measuring the kind of frames and the amount of information for the image transmitted through the transmission path;
   e) image charge information storage means for storing the charge information for the image, to be used in said accounting process.

29. An image transmission system according to claim 28, wherein said accounting process means is provided in the transmitting side.

30. An image transmission system according to claim 28, wherein said accounting process means is provided in the receiving side.

31. An image transmission system according to claim 28, wherein said accounting process means is provided both in the transmitting side and in the receiving side.

32. An image transmission system according to claim 28, further comprising charge payment means for paying the charge at a predetermined interval.

33. An image transmission system according to claim 32, wherein said accounting process means is provided in the transmitting side.

34. An image transmission system according to claim 32, wherein said accounting process means is provided in the receiving side.

35. An image transmission system according to claim 32, wherein said accounting process means is provided both in the transmitting side and in the receiving side.

36. An image transmission system according to claim 32, further comprising cypher means for effecting at least encyphering or digital signature on said transmitted information.

37. An image transmission system according to claim 28, further comprising cypher means for effecting at least encyphering or digital signature on said transmitted information.

38. An image transmission system for transmitting MPEG data through a transmission path, comprising:
   a) traffic check means for checking the traffic in said transmission path;
   b) frame setting means for selectively setting the kinds of frames for MPEG data to be transmitted, according to the traffic in said transmission path;
   c) accounting processing means for effecting an accounting process with a charge system according to the kinds of frames and the amount of information of said transmitted MPEG data;
   d) image charge information storage means for storing the charge information for the image, to be used in said accounting process.

39. An image transmission system according to claim 38, wherein said accounting process means is provided in the transmitting side.

40. An image transmission system according to claim 38, wherein said accounting process means is provided in the receiving side.

41. An image transmission system according to claim 38, wherein said accounting process means is provided both in the transmitting side and in the receiving side.

42. An image transmission system according to claim 38, further comprising charge payment means for paying the charge at a predetermined interval.

43. An image transmission system according to claim 42, wherein said accounting process means is provided in the transmitting side.

44. An image transmission system according to claim 42, wherein said accounting process means is provided in the receiving side.

45. An image transmission system according to claim 42, wherein said accounting process means is provided both in the transmitting side and in the receiving side.

46. An image transmission system according to claim 42, further comprising cypher means for effecting at least encyphering or digital signature on said transmitted information.

47. An image transmission system according to claim 38, further comprising cypher means for effecting at least encyphering or digital signature on said transmitted information.

48. An image transmission system for handling MPEG data, comprising:
   a) accounting means for effecting an accounting process according to the kind of frames transmitted among said MPEG data; and
   b) charge storage means for storing the charge for the image.

49. An image transmission system for handling MPEG data, comprising:
   a) detecting means for detecting the kind of frames transmitted among said MPEG data; and
   b) accounting means for effecting an accounting process according to said kind.

50. An image transmission system according to claim 49, further comprising charge payment means for paying the charge at a predetermined interval.

51. An image transmission system according to claim 49, wherein said accounting means is provided in the transmitting side.

52. An image transmission system according to claim 49, wherein said accounting means is provided in the receiving side.

53. An image transmission system according to claim 49, wherein said accounting means is provided both in the transmitting side and in the receiving side.

54. An image transmission system according to claim 49, wherein all the frames of said MPEG data are transmitted, and said accounting means is adapted to effect an accounting process according to the kind of frames decoded among said MPEG data.

55. An image transmission system according to claim 54, further comprising cypher means for effecting at least encyphering or digital signature on said transmitted information.

56. An image transmission system according to claim 49, further comprising cypher means for effecting at least encyphering or digital signature on said transmitted information.

57. An image transmission system according to claim 50, further comprising cypher means for effecting at least encyphering or digital signature on said transmitted information.

58. An image transmission system for handling MPEG data, comprising:
   a) means for detecting the kind and the amount of information of frames transmitted among said MPEG data; and
   b) accounting means for effecting an accounting process according to said kind and the amount of information.

59. An image transmission system according to claim 58, further comprising charge payment means for paying the charge at a predetermined interval.

60. An image transmission system according to claim 58, wherein said accounting means is provided in the transmitting side.

61. An image transmission system according to claim 58, wherein said accounting means is provided in the receiving side.

62. An image transmission system according to claim 58, wherein said accounting means is provided both in the transmitting side and in the receiving side.

63. An image transmission system according to claim 58, wherein all the frames of said MPEG data are transmitted, and said accounting means is adapted to effect an accounting process according to the kind of frames decoded among said MPEG data.

64. An image transmission system according to claim 58, further comprising cypher means for effecting at least encyphering or digital signature on said transmitted information.

65. An image transmission system according to claim 58, further comprising cypher means for effecting at least encyphering or digital signature on said transmitted information.

66. An image transmission system according to claim 57, further comprising cypher means for effecting at least encyphering or digital signature on said transmitted information.

67. An image transmission system for handling MPEG data, comprising:
   a) accounting means for effecting an accounting process according to the kind of frames transmitted among said MPEG data;
   b) information amount measuring means for measuring the amount of information of said transmitted frames; and
   c) charge storage means for storing the charge for the image.

68. An image transmission system according to claim 67, further comprising charge payment means for paying the charge at a predetermined interval.

69. An image transmission system according to claim 68, wherein said accounting means is provided in the transmitting side.

70. An image transmission system according to claim 68, wherein said accounting means is provided in the receiving side.

71. An image transmission system according to claim 67, wherein said accounting means is provided both in the transmitting side and in the receiving side.

72. An image transmission system according to claim 67, wherein all the frames of said MPEG data are transmitted, and said accounting means is adapted to effect an accounting process according to the kind of frames decoded among said MPEG data.

73. An image transmission system according to claim 72, further comprising cypher means for effecting at least encyphering or digital signature on said transmitted information.

74. An image transmission system according to claim 67, further comprising cypher means for effecting at least encyphering or digital signature on said transmitted information.

75. An image transmission system according to claim 68, further comprising cypher means for effecting at least encyphering or digital signature on said transmitted information.

76. An image transmission system for handling MPEG data, comprising:
   a) accounting means for effecting an accounting process according to the kind and the amount of information of the frames transmitted among said MPEG data; and
   b) charge storage means for storing the charge for the image.

77. An image transmission system according to claim 76, further comprising charge payment means for paying the charge at a predetermined interval.

78. An image transmission system according to claim 76, wherein said accounting means is provided in the transmitting side.

79. An image transmission system according to claim 76, wherein said accounting means is provided in the receiving side.

80. An image transmission system according to claim 76, wherein said accounting means is provided both in the transmitting side and in the receiving side.

81. An image transmission system according to claim 76, wherein all the frames of said MPEG data are transmitted, and said accounting means is adapted to effect an accounting process according to the kind of frames decoded among said MPEG data.

82. An image transmission system according to claim 81, further comprising cypher means for effecting at least encyphering or digital signature on said transmitted information.

83. An image transmission system according to claim 76, further comprising cypher means for effecting at least encyphering or digital signature on said transmitted information.

84. An image transmission system according to claim 77, further comprising cypher means for effecting at least encyphering or digital signature on said transmitted information.

85. An image transmission system for handling MPEG data, comprising:
   a) accounting means for effecting an accounting process according to the kind and the amount of information of the frames transmitted among said MPEG data;
   b) information amount measuring means for measuring the amount of information of said transmitted frames; and
   c) charge storage means for storing the charge for the image.

86. An image transmission system according to claim 85, further comprising charge payment means for paying the charge at a predetermined interval.

87. An image transmission system according to claim 85, wherein said accounting means is provided in the transmitting side.

88. An image transmission system according to claim 85, wherein said accounting means is provided in the receiving side.

89. An image transmission system according to claim 85, wherein said accounting means is provided both in the transmitting side and in the receiving side.

90. An image transmission system according to claim 85, wherein all the frames of said MPEG data are transmitted, and said accounting means is adapted to effect an accounting process according to the kind of frames decoded among said MPEG data.

91. An image transmission system according to claim 90, further comprising cypher means for effecting at least encyphering or digital signature on said transmitted information.

92. An image transmission system according to claim 85, further comprising cypher means for effecting at least encyphering or digital signature on said transmitted information.

93. An image transmission system according to claim 86, further comprising cypher means for effecting at least encyphering or digital signature on said transmitted information.

\* \* \* \* \*

UNITED STATES PATENT AND TRADEMARK OFFICE
CERTIFICATE OF CORRECTION

PATENT NO. : 5,909,238

DATED : June 1, 1999

INVENTOR(S) : TAKAYUKI NAGASHIMA ET AL.

It is certified that error appears in the above-identified patent and that said Letters Patent is hereby corrected as shown below:

ON TITLE PAGE

[56] REFERENCES CITED "Hiroshima" should read
--Hirashima-- and "Choddha et al.," should
read --Chaddha et al.,--.

COLUMN 5 line 62, "(Moving picture experts group)" should
read --(Moving Picture Exports Group)--.

COLUMN 6 line 7, "use" should read --use in--;
line 8, "etc." should read --etc.,--; and
line 14,"highly" should read --high--.

COLUMN 9 line 13,"following" should read --following,--;
line 32,"following" should read --following,--;
line 55,"an enough" should read --a sufficient--; and
line 67,"example," should read --for example,--.

UNITED STATES PATENT AND TRADEMARK OFFICE
CERTIFICATE OF CORRECTION

PATENT NO. : 5,909,238
DATED : June 1, 1999
INVENTOR(S) : TAKAYUKI NAGASHIMA ET AL.

It is certified that error appears in the above-identified patent and that said Letters Patent is hereby corrected as shown below:

COLUMN 10 line 10, "following" should read --following,--.

COLUMN 11 line 20, "However" should read --However,--;
   line 23, "Also" should read --Also,--; and
   line 56, "following" should read --following,--.

COLUMN 12 line 41, "following" should read --following,--.

COLUMN 21 line 18, "etc." should read --etc.,--.

COLUMN 24 line 64, "particular" should read --particular,--.

UNITED STATES PATENT AND TRADEMARK OFFICE
CERTIFICATE OF CORRECTION

PATENT NO. : 5,909,238

DATED : June 1, 1999

INVENTOR(S) : TAKAYUKI NAGASHIMA ET AL.

It is certified that error appears in the above-identified patent and that said Letters Patent is hereby corrected as shown below:

COLUMN 25 line 19, "etc." should read --etc.,--; and
line 54, ""Modern cypher theory"," should read --"Modern Cypher Theory",--.

COLUMN 30 line 19, "claim 58," should read --claim 63,--;
line 26, "claim 57," should read --claim 59,--;
line 43, "claim 68," should read --claim 67,--; and

UNITED STATES PATENT AND TRADEMARK OFFICE
CERTIFICATE OF CORRECTION

PATENT NO. : 5,909,238
DATED : June 1, 1999
INVENTOR(S) : TAKAYUKI NAGASHIMA ET AL.

It is certified that error appears in the above-identified patent and that said Letters Patent is hereby corrected as shown below:

<u>COLUMN 30</u> continued line 46, "claim 68," should read --claim 67,--.

Signed and Sealed this

Fifteenth Day of August, 2000

Q. TODD DICKINSON

*Attest:*

*Attesting Officer*       *Director of Patents and Trademarks*